United States Patent
Allain et al.

(10) Patent No.: US 9,359,215 B2
(45) Date of Patent: Jun. 7, 2016

(54) PRECIPITATED SILICA HAVING PARTICULAR MORPHOLOGY, GRADING AND POROSITY, PREPARATION THEREOF AND REINFORCING OF POLYMERS THEREWITH

(75) Inventors: Emmanuelle Allain, L'hay les Roses (FR); Julien Hernandez, Antony (FR); Lionel Ventelon, Nivelles (BE); Laurent Guy, Rillieux la Pape (FR); Marc Airiau, Rueil-Malmaison (FR)

(73) Assignee: RHODIA OPERATIONS, Paris (FR)

( * ) Notice: Subject to any disclaimer, the term of this patent is extended or adjusted under 35 U.S.C. 154(b) by 993 days.

(21) Appl. No.: 12/921,423

(22) PCT Filed: Mar. 9, 2009

(86) PCT No.: PCT/EP2009/052726
§ 371 (c)(1),
(2), (4) Date: Mar. 30, 2011

(87) PCT Pub. No.: WO2009/112458
PCT Pub. Date: Sep. 17, 2009

(65) Prior Publication Data
US 2011/0178227 A1 Jul. 21, 2011

(30) Foreign Application Priority Data
Mar. 10, 2008 (FR) ........................... 08 01289

(51) Int. Cl.
*C01B 33/12* (2006.01)
*C01B 33/193* (2006.01)

(52) U.S. Cl.
CPC ............... *C01B 33/193* (2013.01); *C01B 33/12* (2013.01); *Y10T 428/2982* (2015.01)

(58) Field of Classification Search
CPC ....... C08F 210/00; C09D 11/106; C02F 5/10; C02F 5/12; C01B 33/193; C01B 33/18; C01P 2006/12; C01P 2006/80; C01P 2004/61; C01P 2004/50; C01P 2006/19
USPC .................................. 524/554; 423/339, 335
See application file for complete search history.

(56) References Cited

U.S. PATENT DOCUMENTS

| 4,590,052 A | 5/1986 | Chevallier et al. |
| 5,587,416 A | 12/1996 | Chevallier et al. |

(Continued)

FOREIGN PATENT DOCUMENTS

| EP | 0520862 B1 | 12/1992 |
| FR | 2562534 A1 | 10/1985 |

(Continued)

*Primary Examiner* — Melvin C Mayes
*Assistant Examiner* — Smita Patel

(57) ABSTRACT

Precipitated silicas including clusters of large primary silica particles having at the surface thereof small primary silica particles, have a specific surface area CTAB ($S_{CTAB}$) ranging from 60 to 400 m²/g; a cluster average size d50, as measured by XDC grading after ultrasound deagglomeration, such that d50 (nm)>(6214/$S_{CTAB}$ (m²/g)+23; a pore volume distribution such that $V_{(d5-d50)}/V_{(d5-d100)}$>0.906−(0.0013×$S_{CATB}$ (m²/g)); and a pore size distribution such that Mode (nm)> (4166/$S_{CTAB}$ (m²/g))−9.2; such silicas are useful reinforcing fillers for polymers.

12 Claims, 2 Drawing Sheets

(56) References Cited

U.S. PATENT DOCUMENTS

| | | | |
|---|---|---|---|
| 5,882,617 A * | 3/1999 | Chevallier et al. | 423/339 |
| 6,214,912 B1 | 4/2001 | Chevallier et al. | |
| 6,335,396 B1 | 1/2002 | Chevallier et al. | |
| 6,468,493 B1 | 10/2002 | Chevallier et al. | |
| 2004/0067649 A1* | 4/2004 | Hellring et al. | 438/689 |
| 2009/0137732 A1* | 5/2009 | Panz et al. | 524/588 |

FOREIGN PATENT DOCUMENTS

| | | | |
|---|---|---|---|
| FR | 2710629 | * | 4/1995 |
| FR | 2710629 A1 | | 4/1995 |
| FR | 2710630 A1 | | 4/1995 |
| FR | 2763581 A1 | | 11/1998 |
| WO | WO02051749 | * | 7/2002 |
| WO | WO 2008/077948 A1 | | 7/2008 |

* cited by examiner

PRECIPITATED SILICA HAVING PARTICULAR MORPHOLOGY, GRADING AND POROSITY, PREPARATION THEREOF AND REINFORCING OF POLYMERS THEREWITH

CROSS-REFERENCE TO EARLIER APPLICATIONS

This application is a continuation of PCT/EP 2009/052726, filed Mar. 9, 2009 and designating the United States (published in the French language on Sep. 17, 2009, as WO 2009/112458 A1; the title and abstract were also published in English), which claims foreign priority under 35 U.S.C. §119 of FR 0801289, filed Mar. 10, 2008, each hereby expressly incorporated by reference in its entirety and each assigned to the assignee hereof.

The present invention relates to a novel process for the preparation of precipitated silica, to precipitated silicas having specific morphology, specific particle size and specific porosity, which are provided in particular in the form of a powder, of substantially spherical beads or of granules, and to their applications, such as the reinforcing of polymers.

It is known to employ reinforcing white fillers in polymers, in particular elastomers, such as, for example, precipitated silica.

Figure 1:
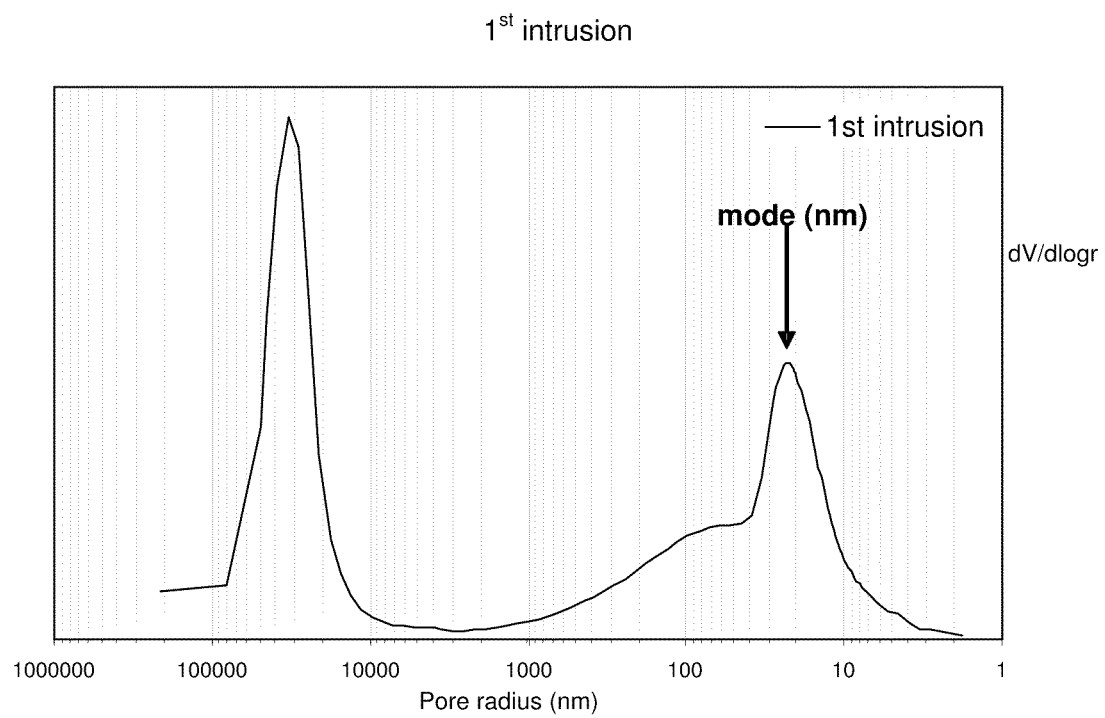
FIG. 1 represents the frequency curve, that is, the derivative of the cumulative curve (cumulative pore volume (ml/g) as a function of the pore radius (nm)). The abscissa of the maximum for pores with radii of less than 100 nm is known as the Mode (in nm).

The aim of the invention is to propose in particular an alternative filler for polymer compositions with atypical characteristics which furthermore provide them with a highly satisfactory compromise in properties, in particular with regard to their rheological, mechanical and dynamic properties, in particular hysteresis properties. The invention advantageously makes possible an improvement in the hysteresis/reinforcing compromise.

The invention first proposes a novel process for the preparation of precipitated silica comprising the reaction of a silicate with an acidifying agent, resulting in a silica suspension being obtained, and then the separation and the drying of this suspension, characterized in that the reaction of the silicate with the acidifying agent is carried out according to the following successive stages:

(i) an aqueous suspension of precipitated silica, exhibiting a pH of between 2.5 and 5.3, is brought into contact (mixed) with acidifying agent and silicate in such a way that the pH of the reaction medium is maintained between 2.5 and 5.3, (ii) an alkaline agent, preferably silicate, is added to the reaction medium obtained, so as to increase the pH of the reaction medium up to a value of between 4.7 and 6.3.

According to a preferred embodiment of the process of the invention, the aqueous suspension of precipitated silica used in stage (i) is prepared in the following way:

(1) an initial vessel heel comprising silicate and an electrolyte is formed, the concentration of silicate (expressed as $SiO_2$) in the said initial vessel heel being less than 100 g/l, in particular less than 80 g/l, and, preferably, the concentration of electrolyte in the said initial vessel heel being less than 17 g/l, in particular less than 15 g/l, (2) acidifying agent is added to the said vessel heel until a value for the pH of the reaction medium of at least approximately 7, preferably of between 7.5 and 8.5, is obtained, (3) acidifying agent and silicate are added simultaneously to the reaction medium, (4) the addition of the silicate is halted while continuing the addition of the acidifying agent to the reaction medium, until a value for the pH of the reaction medium of between 2.5 and 5.3, preferably between 2.8 and 4.9, is obtained.

It has thus been found that the sequence of specific stages, in the process according to the invention and in particular in its preferred embodiment described above, was an important condition in conferring, on the products obtained, their specific characteristics and properties.

In the process according to the invention and in particular in its preferred embodiment, the choice of the acidifying agent, of the alkaline agent and of the silicate is made in a way well known per se.

Use is generally made, as acidifying agent, of a strong inorganic acid, such as sulphuric acid, nitric acid or hydrochloric acid, or an organic acid, such as acetic acid, formic acid or carbonic acid.

The acidifying agent can be diluted or concentrated; its normality can be between 0.4 and 36N, for example between 0.6 and 1.5N.

In particular, in the case where the acidifying agent is sulphuric acid, its concentration can be between 40 and 180 g/l, for example between 60 and 130 g/l.

Use may furthermore be made, as silicate, of any standard form of silicates, such as metasilicates, disilicates and advantageously an alkali metal silicate, in particular sodium silicate or potassium silicate.

The silicate can exhibit a concentration (expressed as $SiO_2$) of between 40 and 330 g/l, for example between 60 and 300 g/l, in particular between 60 and 260 g/l.

Use is generally made, as acidifying agent, of sulphuric acid and, as silicate, of sodium silicate.

In the case where sodium silicate is used, the latter generally exhibits an $SiO_2/Na_2O$ ratio by weight of between 2.5 and 4, for example between 3.2 and 3.8.

The alkaline agent employed during stage (ii) can, for example, be a sodium hydroxide, potassium hydroxide or ammonia solution. Preferably, this alkaline agent is silicate, in particular silicate as used during stage (i).

As regards more particularly the preparation process of the invention, the reaction of the silicate with the acidifying agent is carried out in a specific way as indicated below.

In stage (i):

an aqueous suspension of precipitated silica (which can be a precipitated silica reaction slurry), the said suspension exhibiting a pH of between 2.5 and 5.3, preferably between 2.8 and 4.9, for example between 2.9 and 4.5 (indeed even between 3.5 and 4.4), is brought into contact
with acidifying agent and silicate,
in such a way (in particular at flow rates such) that the pH of the reaction medium is maintained between 2.5 and 5.3, preferably between 2.8 and 4.9, for example between 2.9 and 4.5 (indeed even between 3.5 and 4.4).

The said pH of the reaction medium can vary within the range 2.5-5.3, preferably within the range 2.8-4.9, for example 2.9-4.5 (indeed even 3.5-4.4), or, preferably, remain (substantially) constant within these ranges.

Generally, in this stage (i), the aqueous suspension is brought into contact with the acidifying agent and the silicate by adding acidifying agent and silicate to the aqueous suspension of precipitated silica.

According to an alternative form of the process of the invention, in stage (i), first the acidifying agent and then the silicate are added to the aqueous suspension of precipitated silica.

However, according to a preferred alternative form of the process of the invention, in stage (i), instead the acidifying agent and the silicate are added simultaneously to the aqueous suspension of precipitated silica; preferably, this simultaneous addition is carried out with regulation of the pH of the reaction medium at a value which is (substantially) constant within the abovementioned ranges.

The second stage (ii) of the process according to the invention consists of an addition, to the reaction medium obtained on conclusion of stage (i), of an alkaline agent, preferably silicate, until a value of the pH of the reaction medium of between 4.7 and 6.3, preferably between 5.0 and 5.8, for example between 5.0 and 5.4, is obtained.

This second stage may be optional (that is to say, may not be carried out) in the case where, in stage (i), an aqueous suspension of precipitated silica, exhibiting a pH of between 5.0 and 5.3, is brought into contact (mixed) with acidifying agent and silicate in such a way that the pH of the reaction medium is maintained between 5.0 and 5.3.

Preferably, the process according to the invention comprises stage (ii).

Stage (ii) is usually carried out with stirring.

This is generally also the case for the combined reaction (stages (i) and (ii)).

The combined reaction is generally carried out between 75 and 97° C., preferably between 80 and 96° C.

It can be advantageous, on conclusion of stage (ii), to mature the reaction medium obtained, in particular at the pH obtained on conclusion of this stage (ii), and generally with stirring. This maturing can, for example, last from 2 to 30 minutes, in particular from 3 to 20 minutes, and can be carried out between 75 and 97° C., preferably between 80 and 96° C., in particular at the temperature at which stage (ii) had been carried out. It preferably comprises neither addition of acidifying agent nor addition of silicate.

According to the preferred embodiment of the process of the invention, the reaction of the silicate with the acidifying agent is carried out according to the following successive stages:

(1) an initial vessel heel comprising silicate and an electrolyte is formed, the concentration of silicate (expressed as $SiO_2$) in the said initial vessel heel being less than 100 g/l, in particular less than 80 g/l, and, preferably, the concentration of electrolyte in the said initial vessel heel being less than 17 g/l, in particular less than 15 g/l, for example less than 14 g/l, (2) acidifying agent is added to the said vessel heel until a value for the pH of the reaction medium of at least approximately 7, preferably of between 7.5 and 8.5, for example equal to approximately 8, is obtained, (3) acidifying agent and silicate are added simultaneously to the reaction medium, in particular in such a way (in particular at flow rates such) that the pH of the reaction medium is maintained at least approximately 7, preferably between 7.5 and 8.5, for example at approximately 8, (4) the addition of the silicate is halted while continuing the addition of the acidifying agent to the reaction medium, until a value for the pH of the reaction medium of between 2.5 and 5.3, preferably between 2.8 and 4.9, for example between 2.9 and 4.5 (indeed even between 3.5 and 4.4), is obtained, (i) the aqueous suspension (reaction medium) obtained on conclusion of stage (4) is brought into contact (mixed) with acidifying agent and silicate in such a way that the pH of the reaction medium is maintained between 2.5 and 5.3, preferably between 2.8 and 4.9, for example between 2.9 and 4.5 (indeed even between 3.5 and 4.4), (ii) an alkaline agent, preferably silicate, is added to the reaction medium obtained until a value for the pH of the reaction medium of between 4.7 and 6.3, preferably between 5.0 and 5.8, for example between 5.0 and 5.4, is obtained, it being possible for this stage (ii) to be optional in the case where, in stage (i), an aqueous suspension of precipitated silica, exhibiting a pH of between 5.0 and 5.3, is brought into contact (mixed) with acidifying agent and silicate in such a way that the pH of the reaction medium is maintained between 5.0 and 5.3.

Preferably, the preferred embodiment of the process of the invention comprises stage (ii).

The term "electrolyte" is to be understood here as normally accepted, that is to say that it means any ionic or molecular substance which, when it is in solution, decomposes or dissociates to form ions or charged particles. Mention may be made, as electrolyte, of a salt from the group of the salts of alkali metals and alkaline earth metals, in particular the salt of the starting silicate metal and of the acidifying agent, for example sodium chloride in the case of the reaction of a sodium silicate with hydrochloric acid or, preferably, sodium sulphate in the case of the reaction of a sodium silicate with sulphuric acid.

In stage (1), the concentration of electrolyte in the initial vessel heel is greater than 0 g/l, for example greater than 8 g/l.

The simultaneous addition of stage (3) is generally carried out in such a way that the value of the pH of the reaction medium is always equal (to within ±0.2) to that achieved on conclusion of stage (2).

On conclusion of stage (4), the reaction medium (aqueous suspension) obtained can be matured, at the pH obtained on conclusion of this stage (4), and generally with stirring, for example for 2 to 45 minutes, in particular for 3 to 30 minutes.

Stages (1) to (4), as generally the combined reaction, are generally carried out with stirring.

Likewise, all the stages are usually carried out between 75 and 97° C., preferably between 80 and 96° C.

According to an alternative form of the preferred embodiment of the process of the invention, the combined stages are carried out at an unchanging temperature.

According to another alternative form of the preferred embodiment of the process of the invention, the temperature at the end of the reaction is higher than the temperature at the beginning of the reaction: thus, the temperature at the beginning of the reaction (for example, during stages (1) and (2)) is preferably maintained between 75 and 90° C. and then the temperature is increased, preferably up to a value of between 90 and 97° C., at which value it is maintained (for example, during stages (3), (4), (i) and (ii)) until the end of the reaction.

In the process according to the invention, in particular in the preferred embodiment of the process according to the invention, stage (i) can be carried out in a rapid mixer or in a turbulent flow region, which can make possible better control of the characteristics of the precipitated silicas obtained.

For example, in the case where, in stage (i), first the acidifying agent and then the silicate are added to the aqueous suspension of precipitated silica, the said silicate can then be brought into contact with the medium resulting from the addition of the acidifying agent to the aqueous suspension of precipitated silica in a rapid mixer or in a turbulent flow region.

Likewise, in the case where, in stage (i), the acidifying agent and the silicate are simultaneously added to the aqueous suspension of precipitated silica, the said acidifying agent and the said silicate can then be brought into contact with the aqueous suspension of precipitated silica in a rapid mixer or in a turbulent flow region.

Preferably, the reaction medium obtained in the rapid mixer or in a turbulent flow region feeds a reactor, preferably subjected to stirring, in which reactor stage (ii) is subsequently carried out.

In stage (i), use may be made of a rapid mixer chosen from symmetrical T- or Y-mixers (or tubes), asymmetrical T- or Y-mixers (or tubes), tangential jet mixers, Hartridge-Roughton mixers, vortex mixers or rotor-stator mixers.

Symmetrical T- or Y-mixers (or tubes) are generally composed of two opposing tubes (T-tubes) or two tubes forming an angle of less than 180° (Y-tubes), with the same diameter, discharging into a central tube, the diameter of which is identical or greater than that of the two preceding tubes. They are said to be "symmetrical" because the two tubes for injecting the reactants exhibit the same diameter and the same angle with respect to the central tube, the device being characterized by an axis of symmetry. Preferably, the central tube exhibits a diameter two times greater approximately than the diameter of the opposing tubes; likewise, the fluid velocity in the central tube is preferably equal to half that in the opposing tubes.

However, it is preferable to employ, in particular when the two fluids to be introduced do not exhibit the same flow rate, an asymmetrical T- or Y-mixer (or tube) rather than a symmetrical T- or Y-mixer (or tube). In the asymmetrical devices, one of the fluids (generally the fluid with the lower flow rate) is injected into the central tube by means of a side tube of smaller diameter. The latter forms an angle generally of 90° with the central tube (T-tube); this angle can be different from 90° (Y-tube), giving cocurrent systems (for example, angle of 45°) or countercurrent systems (for example, angle of 135°), with respect to the other stream.

Use is preferably made, as rapid mixer, of a tangential jet mixer, a Hartridge-Roughton mixer or a vortex mixer (or precipitator), which derive from symmetrical T devices.

More particularly, in stage (i), use may be made of a tangential jet, Hartridge-Roughton or vortex rapid mixer comprising a chamber having (a) at least two tangential admissions via which either, on the one hand, the silicate and, on the other hand, the medium resulting from the addition of acidifying agent to the aqueous suspension of precipitated silica or on the one hand, the silicate and the acidifying agent and, on the other hand, the aqueous suspension of precipitated silica enter separately (but at the same time) and (b) an axial outlet via which the reaction medium exits, preferably towards a reactor (vessel) positioned in series after the said mixer. The two tangential admissions are preferably situated symmetrically and in opposing fashion with respect to the central axis of the said chamber.

The chamber of the tangential jet, Hartridge-Roughton or vortex mixer optionally used generally exhibits a circular cross section and is preferably cylindrical in shape.

Each tangential admission tube can exhibit an internal diameter d from 0.5 to 80 mm.

This internal diameter d can be between 0.5 and 10 mm, in particular between 1 and 9 mm, for example between 2 and 7 mm. However, in particular on the industrial scale, it is preferably between 10 and 80 mm, in particular between 20 and 60 mm, for example between 30 and 50 mm.

The internal diameter of the chamber of the tangential jet, Hartridge-Roughton or vortex mixer optionally employed can be between 3 d and 6 d, in particular between 3 d and 5 d, for example equal to 4 d; the internal diameter of the axial outlet tube can be between 1 d and 3 d, in particular between 1.5 d and 2.5 d, for example equal to 2 d.

The silicate and acidifying agent flow rates are, for example, determined so that, at the point of confluence, the two streams of reactants come into contact with one another in a region of sufficiently turbulent flow.

In the process according to the invention, in particular in the preferred embodiment of the process according to the invention, on conclusion of stage (ii), optionally followed by a maturing, a silica slurry is obtained and is subsequently separated (liquid/solid separation).

The separation carried out in the preparation process according to the invention, in particular in its preferred embodiment, usually comprises a filtration, followed by a washing operation, if necessary. The filtration is carried out according to any suitable method, for example using a filter press, a belt filter or a vacuum filter.

The silica suspension thus recovered (filtration cake) is subsequently dried.

This drying operation can be carried out according to any means known per se.

Preferably, the drying operation is carried out by atomization. To this end, use may be made of any type of suitable atomizer, in particular a rotary, nozzle, liquid pressure or two-fluid atomizer. Generally, when the filtration is carried out using a filter press, a nozzle atomizer is used and, when the filtration is carried out using a vacuum filter, a rotary atomizer is used.

It should be noted that the filtration cake is not always under conditions which make possible atomization, in particular because of its high viscosity. In a way known per se, the cake is then subjected to a disintegration operation. This operation can be carried out mechanically, by passing the cake into a mill of colloid or bead type. Disintegrating is generally carried out in the presence of an aluminium compound, in particular of sodium aluminate, and optionally in the presence of an acidifying agent, such as described above (in the latter case, the aluminium compound and the acidifying agent are generally added simultaneously). The disintegration operation makes it possible in particular to lower the viscosity of the suspension to be subsequently dried.

When the drying operation is carried out using a nozzle atomizer, the silica capable of being then obtained usually exists in the form of substantially spherical beads.

On conclusion of the drying operation, the product recovered can then be subjected to a milling stage. The silica which is then capable of being obtained generally exists in the form of a powder.

When the drying is carried out using a rotary atomizer, the silica capable of being then obtained can exist in the form of a powder.

Finally, the product, dried (in particular by a rotary atomizer) or milled as indicated above, can optionally be subjected to an agglomeration stage which comprises, for example, a direct compression, a wet granulation (that is to say, with the use of a binder, such as water, silica suspension, and the like), an extrusion or, preferably, a dry compacting. When the latter technique is employed, it may prove to be advisable, before carrying out the compacting, to deaerate (operation also referred to as predensifying or degassing) the pulverulent products so as to remove the air included in the latter and to provide more uniform compacting.

The silica capable of being then obtained by this agglomeration stage generally exists in the form of granules.

The silica powders, as well as the silica beads, obtained by the process according to the invention thus offer the advantage, inter alia, of providing access, in a simple, effective and economical way, to granules, in particular by conventional shaping operations, such as, for example, a granulation or a compacting, without the latter causing damage capable of obscuring, indeed even destroying, the good properties intrinsically attached to these powders or these beads, as may be the case in the prior art on employing conventional powders.

The preparation process according to the invention, in particular according to its preferred form, makes it possible in particular to obtain precipitated silicas which generally exhibit a good ability to disperse (dispersibility) in polymers and which confer, on the latter, a highly satisfactory compromise in properties. The precipitated silicas obtained preferably exhibit a specific morphology, a specific particle size and a specific porosity.

The silicas capable of being obtained by the process of the invention constitute one of the aspects of the present invention.

Other subject-matters of the invention comprise novel precipitated silicas which have a specific morphology, a specific particle size and a specific porosity; in addition, they generally exhibit a good ability to disperse (dispersibility) in polymers, conferring on the latter a highly satisfactory compromise in properties, in particular with regard to their mechanical, dynamic and rheological properties. They advantageously make possible an improvement in the reinforcing/hysteresis properties compromise.

In the account which follows, the CTAB specific surface is the external surface which can be determined according to the method described below derived from Standard NF ISO 5794-1 (February 2006, $2^{nd}$ printing 2006-03).

Principle

Silica is brought into contact with a solution of cetyltrimethylammonium (or hexadecyltrimethylammonium) bromide, commonly known as CTAB, with magnetic stirring. The layer of CTAB adsorbed is proportional to the specific surface of the silica.

The silica and the residual CTAB solution are separated. The excess CTAB is titrated with a solution of di(2-ethylhexyl) sodium sulphosuccinate, commonly known as OT, up to a point of maximum turbidity.

The external surface of a silica can be determined by the amount of CTAB which it is capable of adsorbing, expressed in $m^2/g$, with regard to product dried at 105° C. for 2 hours.

Apparatus and equipment

Apparatus 0.45 μm syringe filters

Flasks 5000 ml volumetric flask

Magnetic bars 10 ml syringes

Equipment

Balance accurate to within 0.1 mg

Magnetic Stirrers

Automatic titrator equipped i) with a photoelectric detector or with a light meter which measures the light transmission factor at the wavelength of 550 nm and ii) with a burette, for example a Mettler DL 21 titrator with a 550 nm phototrode.

Procedure

Throughout the duration of the analysis, all the devices and all the solutions must be at a temperature of between 23 and 27° C., in order to prevent the onset of crystallization, CTAB crystallizing at 20° C.

Reactants

.CTAB solution with a concentration (Co) of 11 g/l, buffered at pH 9.6:

The following are weighed/introduced into a 5 litre volumetric flask containing approximately 1 litre of deionized water:

5.426 g of boric acid, 6.489 g of potassium chloride and 64.5 $cm^3$ of 1 mol/l sodium hydroxide with a burette.

The mixture is then homogenized.

55 g±0.001 g of CTAB and approximately 3 litres of deionized water are added.

Homogenization is carried out until the CTAB has completely dissolved and the volume is adjusted to 5 litres with deionized water.

.Aerosol OT (di(2-ethylhexyl) sodium sulphosuccinate) solution:

Approximately 1.85 g±0.01 g of aerosol are weighed out and dissolved in a one litre volumetric flask with deionized water (gentle heating is carried out in order to accelerate the dissolution with magnetic stirring).

The solution obtained is left standing for 12 days before use.

Analytical Method

.Preparation of the Suspension

The following approximate amounts are weighed out exactly in a TP 50/100 flask:

1.60 g±0.05 g of silica for an expected specific surface of less than 130 $m^2/g$, 0.90 g±0.05 g of silica for an expected specific surface of between 130 and 180 $m^2/g$, 0.66 g±0.05 g of silica for an expected specific surface of greater than 180 $m^2/g$.

90 ml (Vo) of CTAB solution are subsequently added to this weight W of silica.

.Adsorption

A magnetic bar with a length equal to 35 mm (for example, "double-ended" magnetic bar) is introduced into the flask, which is then stirred using magnetic stirrers (residence time of 40 minutes, stirring rate of 600 rev/min).

.Filtration

A sample is removed from the suspension using a syringe. Then, after having equipped the syringe with a 0.45 μm filter, the suspension is filtered and approximately 10 ml of filtered solution are recovered in a flask.

.Measurements

The automatic titrator is prepared in accordance with the instructions of the manufacturer. The titration parameters are chosen so as to obtain rapid introduction of Aerosol OT solution at the beginning of the titration and slowing down as a function of the slope of the titration curve in the vicinity of the end point.

Blank titration

A first titration or blank titration (titration 1) is carried out daily beforehand, before the titrating of the sample, on the starting CTAB solution, that is to say before mixing with the silica.

Approximately 5 g of starting CTAB solution are weighed out exactly and are then introduced into a flask.

54 ml of deionized water are added thereto.

Titration is carried out (Titration 1).

For this, the flask is placed in the automatic titrator and the speed of the stirrer is adjusted so as to be able to carry out the mixing without producing foam.

The titrating, which ends automatically once the point of maximum turbidity is reached, is then begun.

Each titration is carried out in duplicate.

V1 is the volume (in ml) of Aerosol OT solution obtained for the titration of the weight W1 (in g) of the starting CTAB solution used for this titration.

Titration of the Sample

Approximately 5 g of solution recovered after the filtration are weighed out exactly and are then introduced into a flask. 54 ml of deionized water are added thereto.

Titration is carried out (titration 2).

For this, the flask is placed in the automatic titrator and the speed of the stirrer is adjusted so as to be able to carry out the mixing without producing foam.

Titration, which ends automatically once the point of maximum turbidity is reached, is then begun.

Each titration is carried out in duplicate.

V2 is the volume (in ml) of Aerosol OT solution obtained for the titration of the weight W2 (in g) of the CTAB solution recovered after the filtration and used for this titration.

Calculation

The CTAB specific surface (in m$^2$/g) is equal to:

$$578.4\times(Vo/W)\times(100/(100-Hum))\times(Co/1000)\times[((V1/W1)-(V2/W2))/(V1/W1)]$$

with:

Vo: volume (in ml) of starting CTAB solution (90 ml) added to the silica in order to prepare the suspension for the purpose of the titration, W: weight (in g) of silica to which the starting CTAB solution is added in order to prepare the suspension for the purpose of the titration, Hum: humidity (or residual water content) of the silica, measured after heat treatment at 105° C. for 2 hours (as number of %)

Co: initial concentration (in g/l) of the CTAB solution (11 g/l)

W1: weight (in g) of the starting CTAB solution used for Titration 1, that is to say before mixing with the silica V1: volume (in ml) of Aerosol OT solution obtained for the titration of W1 (Titration 1)

W2: weight (in g) of the CTAB solution used for Titration 2, that is to say after mixing with the silica and adsorption on the silica V2: volume (in ml) of Aerosol OT solution obtained for the titration of W2 (Titration 2)

578.4 corresponds to the surface area (in m$^2$) occupied by 1 gram of CTAB.

The BET specific surface is determined according to a method resulting from the Brunauer-Emmet-Teller method described in "The Journal of the American Chemical Society", Vol. 60, page 309, February 1938, and corresponding to Standard NF ISO 9277 (December 1996).

The pH is measured according to the following method, deriving from Standard ISO 787/9 (pH of a 5% suspension in water):

Equipment:
calibrated pH meter (accuracy of reading to $\frac{1}{100}^{th}$)
combined glass electrode
200 ml beaker
100 ml graduated measuring cylinder
balance accurate to 0.01 g.

Procedure:
5 g of silica are weighed to within 0.01 g into the 200 ml beaker. 95 ml of water, measured from the graduated measuring cylinder, are subsequently added to the silica powder. The suspension thus obtained is vigorously stirred (magnetic stirring) for 10 minutes. The pH measurement is then carried out.

The XDC method of particle size analysis by centrifugal sedimentation, using which the d50 median size of aggregates is measured, is described below:

Apparatus Necessary

BI-XDC (BROOKHAVEN INSTRUMENT X DISC CENTRIFUGE) centrifugal sedimentation particle sizer, sold by Brookhaven Instrument Corporation
50 ml tall-form beaker,
50 ml graduated measuring cylinder
1500 watt Branson ultrasonic probe, without tip, with a diameter of 13 mm,
deionized water
crystallizing dish filled with ice
magnetic stirrer Measurement Conditions Windows 3.54 version of the software (supplied by the manufacturer of the particle sizer)
stationary mode
rotational speed: 5000 rev/min
duration of the analysis: 120 minutes
density (silica): 2.1
volume of the suspension to be withdrawn: 15 ml Preparation of the Sample 3.2 g of silica and 40 ml of deionized water are added to the tall-form beaker.

The beaker comprising the suspension is placed in the crystallizing dish filled with ice.

The ultrasonic probe is immersed in the beaker.

The suspension is deagglomerated for 8 minutes using the 1500 watt Branson probe (used at 60% of maximum power).

When the deagglomeration is complete, the beaker is placed on a magnetic stirrer.

The dispersion obtained is cooled to ambient temperature (21° C.).

Preparation of the Particle Sizer

The device is switched on and allowed to heat up for at least 30 minutes.

The disc is rinsed twice with deionized water.

15 ml of the sample to be analysed are introduced into the disc and stirring is begun.

The measurement conditions mentioned above are entered into the software.

The measurements are carried out.

When the measurements have been carried out:

The rotation of the disc is halted.

The disc is rinsed several times with deionized water.

The device is switched off.

Results

A record is made in the device register of the values of the 50% undersize diameter (% by weight) or median size (size for which 50% by weight of aggregates have a size below this size) and optionally the value of the Mode (the derivative of the cumulative particle size curve gives a frequency curve, the abscissa of the maximum of which (abscissa of the main population) is called the Mode).

The pore volumes and pore diameters/radii given are measured by mercury (Hg) porosimetry using a Micromeritics Autopore IV 9520 porosimeter and are calculated by the Washburn relationship with a contact angle theta equal to 140° and a surface tension gamma equal to 485 dynes/cm; each sample is prepared as follows: each sample is dried beforehand in an oven at 200° C. for 2 hours.

$V_{(d5-d50)}$ represents the pore volume composed of the pores with diameters of between d5 and d50 and $V_{(d5-d100)}$ represents the pore volume composed of the pores with diameters of between d5 and d100, do being in this instance the pore diameter for which n % of the total surface area of all the pores is contributed by the pores with a diameter greater than this diameter (the total surface area of the pores (S0) can be determined from the mercury intrusion curve).

The derivative of the cumulative curve (cumulative pore volume (ml/g) as a function of the pore radius (nm), FIG. 1) gives a frequency curve, the abscissa of the maximum of which (abscissa of the main population) for pores with radii of less than 100 nm is known as the Mode (in nm).

The morphology of the silica, the presence of primary particles with different sizes and the size (the diameter) of the said primary particles are illustrated/measured by Transmission Electron Microscopy (TEM), as follows.

1) Principle of the Method:

Transmission electron microscopy (TEM) is used in its imaging mode at magnifications ranging up to 400 000 which are appropriate for characterizing the silica primary particles.

The objective of the characterization by TEM of the silicas according to the invention is to give access to particle size distributions, weighted by number, of the silica primary particles.

The photographs obtained by the TEM technique do not necessarily make it possible to dissociate the various primary particles by image analysis; it is up to the microscopist to identify them; the criterion used for this is the proportion of the circumference which can be recognized. It may happen that, in some regions of the aggregates, it is impossible to identify primary particles (for example in the case of excess local thicknesses of material, or else if the particles are too interpenetrated for the notion of primary particle to make sense). However, this is not an obstacle to the identification of a number of primary particles sufficiently great to obtain significant values.

The principle of the method is thus that of identifying a sufficiently high number of primary particles and of analysing their dimensions.

The primary particles of the silica according to the invention can be compared to spheres; the analysis of the dimensions is carried out from the TEM photograph; it consists, for each primary particle identified, in superimposing a circle which correctly reproduces the circumference of the particle and in measuring its diameter. This operation is repeated over a sufficiently high number of primary particles in order to establish a particle size distribution for these primary particles which is weighted by number. This distribution is a differential distribution. A cumulative particle size distribution of the primary particles is deduced therefrom. The descriptor chosen in order to make use of these dimensions is deduced from the cumulative particle size distribution. It is the number median diameter d50%. This is the diameter such that 50% of the primary particles counted have a diameter of less than this value and 50% of the primary particles counted have a diameter of greater than this value.

As described below, the silica according to the invention is formed of two families of silica primary particles, the diameters of which are different, which are easily discernible on the photographs obtained by the TEM technique. For a given silica, the operations of identifying and counting the primary particles are thus carried out twice, a first time for the small primary particles and a second time for the large primary particles; these two operations are carried out separately and the results obtained are represented by two particle size distributions weighted by number, which are not related in any way. Due to the large differences in diameter between the small primary particles and the large primary particles, it is necessary to carry out two acquisitions of separate photographs, at two different magnifications; normal magnification values are 150 000 to 250 000 for the particle size analysis of the large primary particles and 400 000 for the particle size analysis of the small primary particles. These values can vary according to the dimensions of the particles.

2) Procedure:

The apparatus necessary is as follows:

a) Transmission electron microscope giving access to magnifications ranging at least up to 400 000. The acceleration voltage will preferably be chosen to be equal to 120 kV.

b) Grids for TEM observation. One possibility is to prepare 200 mesh copper grids according to the following procedure:

preparation of a solution of collodion (nitrocellulose), at 0.2% as polymer, in isoamyl acetate, filling a crystallizing dish with deionized water and placing the TEM grids inside, depositing a few drops of the collodion solution at the surface of the water, evaporating the solvent, so as to prepare a collodion film at the surface of the water, withdrawing, so as to deposit the collodion film at the surface of the grids, vacuum deposition of a carbon grain with a size of between 2 and 3 nm using a device which can perform carbon coating, rendering the carbon-coated collodion surface hydrophilic, via an air plasma generated under high voltage and under controlled vacuum, using a device for rendering hydrophilic.

After this operation, the surface remains hydrophilic only for approximately 30 minutes; it is thus preferable to carry out this operation only at the last moment, once the silica suspension is ready.

The transmission electron microscope has to be correctly aligned beforehand according to the procedure supplied by its manufacturer. In addition, it has to form the subject of a verification that it is operating satisfactorily with regard to its magnification. Use is made, to this end, of a certified reference standard or material, such that the 150 000 and 400 000 magnifications are included in the range of the magnification values selected for the verification. The difference found between the distance values measured and the distance values supplied on the certificate of the reference standard or material must be at most equal to 10%.

The procedure breaks down as follows:

i) Preparation of a suspension of silica deagglomerated using ultrasound according to the protocol given for the preparation of the sample in the method for XDC particle size analysis by centrifugal sedimentation described above.

ii) Diluting this suspension in deionized water by a factor 50.

iii) Depositing a few microlitres of this suspension on a hydrophilized TEM grid (less than 5 µl).

iv) Once the grid is dry, placing it on the microscope stage.

v) Introducing the microscope stage into the microscope and carrying out the usual adjustments (in particular eucentricity and objective astigmatism).

vi) As the silica is highly sensitive to electron radiation, the photographs have to be acquired over fields which have never been exposed to electrons and under conditions such that exposure of the field observed to electrons is as short as possible, including the time to take the photograph (<5 seconds). If necessary, a low dose exposure method or an equivalent is used. Great importance should be attached to the detailed observation of the field observed, in order to be certain that irradiation damage is negligible. If, despite all these precautions, irreversible damage appears on the sample, it will be necessary to envisage observation under cold conditions by means of a microscope stage cooled to the temperature of liquid nitrogen.

vii) At least approximately ten photographs are taken at a magnification of 150 000 and at least approximately ten photographs are taken at a magnification of 400 000, the object being to be guaranteed to count at least 200 small primary particles and 200 large primary particles. The area of grid effectively used for the identification and the counting of the particles must be at least 0.5 μm² for the small primary particles and 3.0 μm² for the large primary particles.

viii) It is subsequently considered that the small primary particles are the particles included within a circle with a diameter of strictly less than 10 nm and that the large primary particles are the particles included within a circle with a diameter of greater than or equal to 10 nm.

ix) As stated above, the determination of the particle size distribution of the small primary particles and the determination of the particle size distribution of the large primary particles are carried out separately, these two distributions being number-weighted. The objects identified as being primary particles are comparable to spheres and the circle which is considered in order to characterize each particle is the circle within which the particle in question is included. This operation can be carried out using software, such as, for example, ImageJ, Adobe Photoshop or Analysis.

20 Particle size categories are defined between 0 and 10 nm for the small primary particles, in linear fashion (that is to say, categories with a width of 0.5 nm); 20 particle size categories are defined above 10 nm for the large primary particles, in linear fashion, and serve to represent all the large primary particles identified.

The identification of the primary particles is based on the portion of their periphery which is recognisable. In the case of the large primary particles, it is considered that approximately a third of the circumference must at a minimum be recognisable in order to validate the identification. This is the case for the particles situated at the periphery of the aggregate or else for the particles exhibiting a sufficient difference in contrast to the remainder of the aggregate.

In the case of the small primary particles, it is considered that approximately half of the circumference must at a minimum be recognisable in order to validate the identification. This is observed at the periphery of the aggregates, on the small particles visible at the surface of the large primary particles, or else in thin regions of the aggregate, for small particles exhibiting a sufficient difference in contrast to the remainder of the aggregate.

x) For each type of primary particle, large or small, the differential particle size distribution by number is determined and, from this differential distribution, the cumulative particle size distribution is determined. The latter operation can be carried out using software, such as, for example, Microsoft Excel. The number median diameter D50%, expressed in nanometers, is determined from each cumulative particle size distribution.

xi) Once these two particle size distributions are determined, it is necessary to verify that this step of characterization by TEM is well suited to the silica studied by considering, for each of the two families of particles, the envelope of the differential particle size distribution. This envelope must exhibit a maximum in the region from 0 to 10 nm for the family of the small primary particles and it must exhibit a maximum above 10 nm for the family of the large primary particles. This validates the existence of two families of particles distinct in their dimensions. The morphology of the silica and the presence of primary particles with different sizes can also be illustrated by small angle X-ray scattering (SAXS), as follows.

1) Principle of the Method:

Small angle X-ray scattering (SAXS) consists in making use of the deviation of an incident beam of X-rays of wavelength λ passing through the sample in a cone with an angle of a few degrees. A wave vector corresponds to a scattering angle θ, which wave vector is defined by the following relationship:

$$q = \frac{4\pi}{\lambda}\sin\frac{\theta}{2}$$

the unit of which is Å⁻¹.

A wave vector q defined in reciprocal space corresponds to each scattering angle. This wave vector corresponds to a spatial scale defined in real space and which is equivalent to 2π/q. Small angle scattering thus characterizes the large distances in the sample and, conversely, large angle scattering characterizes the small distances in the sample. The technique is sensitive to the way in which the material is distributed in space.

Basic references with regard to this technique are given below:

[1] Small Angle Scattering of X rays, Guinier A., Fournet G., (1955), Wiley, New York.
[2] Small Angle X Ray Scattering, Clatter O., Kralky O., (1982), Academic Press, New York.
[3] Analysis of the Small-Angle Intensity Scattered by a Porous and Granular Medium, Spalla O., Lyonnard S., Testard F., J. Appl. Cryst. (2003), 36, 338-347.

The configuration required in order to characterize silicas by SAXS according to the criterion defined below is as follows:

SAXS set-up operating in a transmission geometry (that is to say, the incident beam passing through the sample) with an incident wavelength of between 0.5 and 2 angstroms (Å), wave vector q interval of between 0.015 Å⁻¹ and 0.30 Å⁻¹, which makes it possible to characterize distances in real space ranging from 420 to 20 Å, set-up verified in q scale using a suitable standard (for example, silver behenate, octadecanol or any other compound giving a fine SAXS line within the above q interval), one-dimensional or, preferably, two-dimensional linear detector, the set-up must make it possible to measure the transmission of the preparation, that is to say the ratio of the intensity transmitted by the sample to the incident intensity.

Such a set-up can, for example, be a laboratory set-up operating on a source of X-ray tube or else rotating anode type, preferably using the $k_\alpha$ emission of copper at 1.54 Å. The detector can be an image plate or, preferably, a gas detector. A synchrotron SAXS set-up may also be involved.

2) Procedure:

The silica sample is analysed in the pulverulent solid form. The powder is placed between two windows transparent to X-rays. Independently of this preparation, an empty cell is prepared with only two transparent windows, without silica inside. The scattering by the empty cell has to be recorded separately from the scattering by the silica. During this operation, referred to as "measurement of the background", the scattered intensity originates from all the contributions external to the silica, such as the electronic background noise, the scattering by the transparent windows or the residual divergence of the incident beam.

These transparent windows must contribute a low background noise in the face of the intensity scattered by the silica over the wave vector interval investigated. They can be composed of mica, of Kapton film or, preferably, of adhesive Kapton film.

Prior to the SAXS acquisition proper on the silica, the quality of the preparation should be confirmed by means of the measurement of transmission of the cell charged with silica.

The stages to be surmounted are thus as follows:

2.1) Preparation of a Cell Composed of Two Windows without Silica (Empty Cell).

2.2) Preparation of a Cell Composed of Two Windows, with a Sample of Silica Powder Inside.

The amount of silica introduced must be less than 50 mg. The silica must form a layer with a thickness of less than 100 μm. The aim is preferably to obtain a monolayer of silica grains positioned on a window, which is easier to obtain with adhesive windows. The quality of the preparation is monitored by the measurement of the transmission (stage 2.3)).

2.3) Measurement of the Transmission of the Empty Cell and of the Silica Cell.

The ratio R is defined in the following way:

R=transmission of the silica cell/transmission of the empty cell

R must be between 0.6 and 0.9, in order to minimize the risks of multiple scattering, while retaining a satisfactory signal to noise ratio at high q. If the value of R is too low, the amount of silica visible to the beam should be reduced; if it is too high, silica has to be added.

2.4) SAXS Acquisition on the Empty Cell and on the Silica Cell.

The acquisition times must be determined in such a way that the signal/noise ratio at high q is acceptable. It must be such that, in the immediate vicinity of $q=0.12$ Å$^{-1}$, the fluctuations in the function F(q) defined below must not exceed +/−5% with respect to the value which the function F has at this point.

2.5) If a two-dimensional detector was used: radial grouping of each of the two two-dimensional spectra in order to obtain the scattered intensity as a function of the wave vector q.

The determination of the scattered intensity must take into account the exposure time, the intensity of the incident beam, the transmission of the sample and the solid angle intercepted by the pixel of the detector. The determination of the wave vector must take into account the wavelength of the incident beam and the sample-detector distance.

2.6) If a one-dimensional detector was used: the preceding determinations relating to the scattered intensity and the wave vector are to be carried out but there is no radial grouping to be provided.

2.7) Two spectra are thus obtained in which the information is reduced to the variation in the scattered intensity as a function of the wave vector q: one spectrum for the empty cell and one spectrum for the silica cell.

2.8) Subtraction of the intensity scattered by the empty cell from the intensity scattered by the silica cell (subtraction of background).

2.9) The SAXS spectrum of the silica, after subtraction of background, exhibits a monotonic decrease which takes place according to conditions similar to the Porod conditions, that is to say that the intensity decreases very rapidly with the wave vector according to a law similar to a $q^{-4}$ power law. The small deviations with respect to this Porod's law are made more visible by representing the data according to the "Kralky-Porod" method. It is a question of representing F(q) as a function of q, with:

$$F(q)=I \times q^4$$

where I represents the scattered intensity after subtraction of the background and q represents the wave vector.

2.10) in the Kralky-Porod representation, when the spectrum is described in the direction of the increasing wave vectors, the presence of two populations of particle sizes is reflected by a first growth in the function F(q), which characterizes the larger particles, and then by a second growth in the function F(q), which characterizes the smaller particles. It may be possible to observe an oscillation in the intensity with regard to the first growth, which may be observed if the size distribution of the larger particles is relatively narrow.

2.11) The SAXS criterion defined in the context of the present account is based on the growth of the function F between two defined wave vector limits, which are $q1=0.03$ Å$^{-1}$ and $q2=0.12$ Å$^{-1}$.

A ratio (parameter) C is defined in the following way:

$$C=[F(q2)-F(q1)]/F(q2)$$

Figure 2:
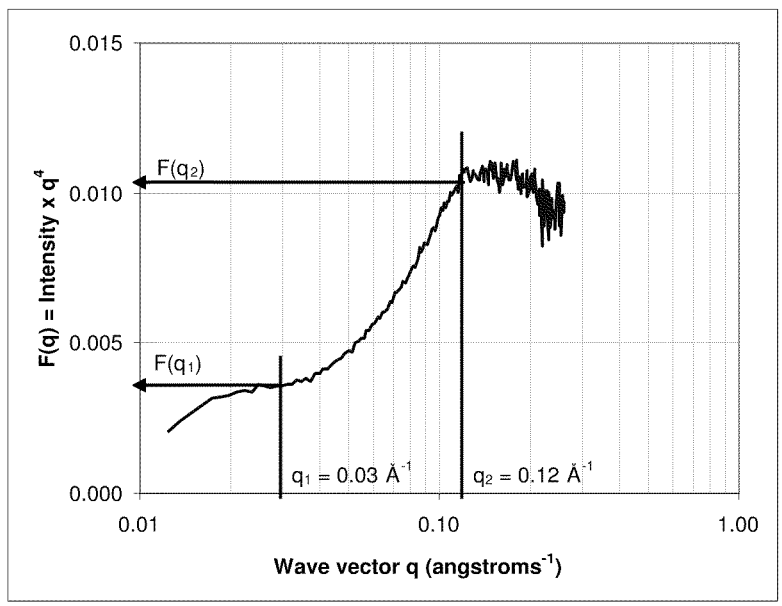
FIG. 2 represents an experimental result on a silica according to the invention, wherein the change in F(q) is plotted as a function of the wave vector q.

2.12) An example of an experimental result on a silica according to the invention is given in FIG. 2.

The change in $F(q)=I \times q^4$ with I=scattered intensity after subtraction of the background is plotted in this figure.

For this silica, $F(q1)=3.6 \times 10^{-3}$ and $F(q2)=1.07 \times 10^{-2}$ are obtained.

$C=(1.07 \times 10^{-2}-3.6 \times 10^{-3})/1.07 \times 10^{-2}=0.66$ is deduced therefrom. The ability of the silicas according to the invention to disperse (and to deagglomerate) can be quantified by means of specific deagglomeration tests.

One of the deagglomeration tests is described below:

1) Principle:

The cohesion of the agglomerates is assessed by a particle size measurement (by laser diffraction) carried out on a silica suspension deagglomerated beforehand by ultrasonication; the ability of the silica to deagglomerate (splitting of objects from 0.1 to a few tens of microns) is thus measured.

2) Apparatus:

Malvern Mastersizer 2000, equipped with the hydroG standard module.

Precision balance giving 0.1 mg (for example, Mettler AE260).

Deionized water.

750 watt Bioblock sonicator (Vibracell 75043) (equipped with a tip with a diameter of 13 mm), used at 80% of its nominal power.

50 ml beaker (tall form).

50 ml graduated measuring cylinder.

Crystallizing dish+ice.

3) Measurement Conditions:

The complete analytical conditions are managed manually by adjusting:

the parameters of the sampler
  pump capacity: 1600 rev/min
  stirrer speed: 600 rev/min
the measurement parameters:
  duration of sample measurement: 10 seconds
  duration of background noise measurement: 10 seconds
  number of measurements: 3
the optical properties:
  optical model: Fraunhofer theory
  standard analysis, normal sensitivity 4) Operations to be Carried Out:

i) Preparation of the sample approximately 2 g of the sample to be analysed are weighed out into the beaker placed on the pan of the balance, 50 ml of deionized water are added using the graduated measuring cylinder, the beaker containing the silica suspension is placed in the crystallizing dish containing ice, the ultrasonic probe is immersed in this suspension, only 1 cm being left between the end of the probe and the bottom of the beaker, deagglomeration is carried out for 5 minutes 30 seconds.

ii) Preparation of the particle sizer

Proceed in the following way in the software:

activate a file in which the measurements will be recorded (reader A, for example)

open "measure"—"manual"

open "option"—name of the particle: Fraunhofer—dispersant: water (see section 3, optical properties)

open "preparation device"—launch a cleaning cycle when the cleaning is complete, adjust the parameters of the stirrer and of the pump capacity as indicated in section 3 activate "start".

When the measurements of background noise and alignment are complete, an aliquot portion of the deagglomerated silica suspension is introduced into the vessel, so as to obtain correct obscuration, and the analytical cycle is continued.

When the analysis is complete, a cleaning cycle is launched.

When the cleaning is complete, the pump capacity and the stirring speed are zeroed.

The value of the median diameter $D_{50M}$ (or Malvern median diameter) which is obtained decreases as the ability exhibited by the silica to deagglomerate increases.

A rate of deagglomeration, recorded as α, can be measured by means of another ultrasonic deagglomeration test using a 600 watt probe at 100% power operating in continuous mode. This known test, forming in particular the subject-matter of Application WO99/28376 (reference may also be made to Applications WO99/28380, WO00/73372 and WO00/73373), makes it possible to continuously measure the change in the mean size (by volume) of particle agglomerates during a sonication, according to the following instructions.

The set-up used is composed of a laser particle sizer ("Mastersizer S" type, sold by Malvern Instruments—He—Ne laser source emitting in the red region, wavelength 632.8 nm) and of its preparation device ("Malvern Small Sample Unit MSX1"), between which has been inserted a continuous flow treatment cell (Bioblock M72410) equipped with an ultrasonic probe (600 watt 12.7 mm sonicator of Vibracell type, sold by Bioblock).

A small amount (150 mg) of silica to be analysed is introduced into the preparation device with 160 ml of water, the rate of circulation being set at its maximum. At least three consecutive measurements are carried out in order to determine, according to the known Fraunhofer method of calculation (Malvern 3$$D calculation matrix), the mean initial diameter (by volume) of the agglomerates, recorded as $d_v[0]$. Sonication (continuous mode) is subsequently established at a power of 100% (i.e., 100% of the maximum position of the tip amplitude) and the change in the mean diameter (by volume) $d_v[t]$ as a function of the time "t" is monitored for 8 minutes approximately at the rate of one measurement every 10 seconds approximately. After an induction period (approximately 3-4 minutes), it is observed that the inverse of the mean diameter (by volume) $1/d_v[t]$ varies linearly or substantially linearly with the time "t" (stable deagglomeration conditions). The rate of the agglomeration α is calculated by linear regression of the curve of change in $1/d_v[t]$ as a function of the time "t" in the region of stable deagglomeration conditions (generally, between 4 and 8 minutes approximately); it is expressed in $\mu m^{-1} \cdot min^{-1}$.

The abovementioned Application WO99/28376 describes in detail a measurement device which can be used for carrying out this ultrasonic deagglomeration test. This device consists of a closed circuit in which a stream of particle agglomerates in suspension in liquid can circulate. This device essentially comprises a sample preparation device, a laser particle sizer and a treatment cell. Air bubbles which are formed during the sonication (action of the ultrasonic probe) are able to be continuously removed by bringing the sample preparation device and the treatment cell itself to atmospheric pressure.

The sample preparation device ("Malvern Small Sample Unit MSX1") is intended to receive the sample of silica to be tested (in suspension in liquid) and to cause it to circulate through the circuit at the preadjusted rate (potentiometry—maximum rate of approximately 3 l/min) in the form of a liquid suspension stream. This preparation device consists simply of a receiver which comprises, and through which circulates, the suspension to be analysed. It is equipped with an adjustable-speed stirrer motor in order to prevent sedimentation of the particle agglomerates of the suspension; a centrifugal minipump is intended to provide for the circulation of the suspension in the circuit; the inlet of the preparation device is connected to the open air via an opening intended to receive the sample of charge to be tested and/or the liquid used for the suspension.

A laser particle sizer ("Mastersizer S"), the function of which is to continuously measure, at regular time intervals, the mean size by volume "$d_v$" of the agglomerates at the passage of the stream by virtue of a measurement cell to which the automatic recording and calculating means of the particle sizer are coupled, is connected to the preparation device. It is briefly restated here that laser particle sizers make use, in a known way, of the principle of the diffraction of light by solid objects suspended in a medium, the refractive index of which is different from that of the solid. According to the Fraunhofer theory, there exists a relationship between the size of the object and the diffraction angle of the light (the smaller the object, the greater the diffraction angle). In practice, it is sufficient to measure the amount of light diffracted for different diffraction angles in order to be able to determine the size distribution (by volume) of the sample, $d_v$ corresponding to the mean size by volume of this distribution ($d_v = \Sigma(n_i d_i^4)/\Sigma(n_i d_i^3)$ with $n_i$ the number of objects of the category of size or diameter $d_i$).

Finally, a treatment cell equipped with an ultrasonic probe which can operate continuously and which is intended to continuously break up the particle agglomerates at the passage of the stream is inserted between the preparation device and the laser particle sizer. This stream is thermostatically controlled via a cooling circuit positioned, at the cell, in a jacket surrounding the probe, the temperature being monitored, for example, by a temperature probe immersed in the liquid at the preparation device.

The number of silanols per $nm^2$ of surface area is determined by grafting methanol to the surface of the silica. In a first step, 1 gram of uncured silica is suspended in 10 ml of methanol in a 110 ml autoclave (Top Industrie, reference 09990009). A magnetic bar is introduced and the autoclave, hermetically closed and heat-insulated, is heated at 200° C. (40 bars) on a heating magnetic stirrer for 4 hours. The autoclave is subsequently cooled in a bath of cold water. The grafted silica is recovered by separating by settling and the residual methanol is evaporated under a stream of nitrogen. Finally, the grafted silica is dried at 130° C. under vacuum for 12 hours. The carbon content is determined by elemental analyser (NCS 2500 analyser from CE Instruments) on the uncured silica and on the grafted silica. This quantitative determination of carbon on the grafted silica is carried out in the three days which follow the end of the drying, this being because it is possible for atmospheric moisture or heat to cause hydrolysis of the methanol grafting. The number of silanols per nm² is calculated by the following formula:

$$N_{SiOH/nm2}=[(\% \ C_g - \% \ C_b) \times 6.023 \times 10^{23}]/[S_{BET} \times 10^{18} \times 12 \times 100]$$

with % $C_g$: percentage by weight of carbon present on the grafted silica

% $C_b$: percentage by weight of carbon present on the uncured silica $S_{BET}$: BET specific surface of the silica (m²/g)

A novel precipitated silica is now proposed according to the invention, which silica is characterized in that it has a specific morphology: this is because it is formed of aggregates of silica primary particles (A), at the surface of which occur (are grafted) silica primary particles (B) with a size smaller than that of the primary particles (A).

It is also characterized in that it has:
- a CTAB specific surface ($S_{CTAB}$) of between 60 and 400 m²/g,
- a d50 median size of aggregates (primary particles (A) or large primary particles+primary particles (B) or small primary particles), measured by XDC particle sizing after ultrasonic deagglomeration, such that: d50 (nm)> $(6214/S_{CTAB} \text{ (m}^2\text{/g)})+23$,
- a pore volume distribution such that:

$$V_{(d5-d50)}/V_{(d5-d100)} > 0.906 - (0.0013 \times S_{CTAB} \text{ (m}^2\text{/g)}), \text{ and}$$

a pore size (diameter) distribution such that:

$$\text{Mode (nm)} > (4166 \times S_{CTAB} \text{ (m}^2\text{/g)}) - 9.2.$$

Preferably, the precipitated silica according to the invention exhibits a parameter C, measured by small angle X-ray scattering (SAXS), such that:

$$C/S_{CTAB} \text{ (m}^2\text{/g)} > 0.001.$$

This illustrates a specific morphology, for example the presence of two populations of primary particles of different sizes.

The precipitated silica according to the invention is advantageously formed of aggregates of large silica primary particles on which occur (are grafted) small silica primary particles (spp), the number median diameter of the large primary particles (lpp) being at least 12 nm, in particular at least 13 nm, for example at least 14 nm, indeed even at least 17 nm, and the number median diameter of the small primary particles (spp) being between 2 and 8 nm, in particular between 3 and 6 nm, for example between 3 and 5 nm (diameters determined by TEM).

In general, the precipitated silica according to the present invention comprises (determination by TEM, for example) from 30 to 95%, preferably from 55 to 90%, in particular from 60 to 85%, by number of primary particles (B) (or small primary particles) and from 5 to 70%, preferably from 10 to 45%, in particular from 15 to 40%, by number of primary particles (A) (or large primary particles).

Preferably, in the precipitated silica according to the invention, there are very few, indeed even no, isolated small primary particles ("extragranular"), aggregated or not aggregated together, that is to say not connected to aggregates of large primary particles. The proportion of such isolated small primary particles is generally less than 10% by number, in particular less than 5% by number, for example substantially zero.

Advantageously, in the silica according to the invention, the small primary particles are firmly stuck to the aggregates of large primary particles.

Preferably, the pore volume distribution of the precipitated silica according to the invention is in addition such that $V_{(d5-d50)}/V_{(d5-d100)} > 0.71$, in particular $V_{(d5-d50)}/V_{(d5-d100)} > 0.72$.

The precipitated silica in accordance with the invention has a CTAB specific surface ($S_{CTAB}$) of between 60 and 400 m²/g, preferably between 80 and 300 m²/g, in particular between 100 and 250 m²/g. It can be between 120 and 230 m²/g, in particular between 130 and 210 m²/g, for example between 140 and 200 m²/g.

It generally exhibits a BET specific surface ($S_{BET}$) of between 60 and 500 m²/g, preferably between 90 and 380 m²/g, in particular between 120 and 300 m²/g. It can be between 140 and 270 m²/g, in particular between 160 and 260 m²/g, for example between 175 and 250 m²/g.

Preferably, the precipitated silica according to the invention has a degree of microporosity but not an excessively high degree; thus, in general, its CTAB specific surface ($S_{CTAB}$) and its BET specific surface ($S_{BET}$) are such that the $S_{BET}/S_{CTAB}$ ratio is between 1.0 and 1.5, preferably between 1.1 and 1.4, in particular between 1.15 and 1.35.

The precipitated silicas according to the invention preferably exhibit a satisfactory ability to disperse (dispersibility) in polymers.

Their median diameter ($D_{50M}$), after ultrasonic deagglomeration, is generally less than 6.0 µm, preferably less than 5.0 µm; it can in particular be less than 4.0 µm, for example less than 3.0 µm.

They can also have a rate of deagglomeration α, measured in the pulsed mode ultrasonic deagglomeration test described above, at 100% power of a 600 watt ultrasonic probe, of at least 0.020 µm⁻¹·min⁻¹.

The number of silanols per nm², $N_{SiOH/nm2}$, of the precipitated silicas according to the invention is generally between 3.5 and 6, in particular between 3.9 and 5.5.

The pH of the precipitated silicas according to the invention is usually between 6.2 and 7.6, in particular between 6.4 and 7.4.

They can be provided in the form of substantially spherical beads, in particular with a mean size of at least 80 µm.

This mean size of the beads can be at least 100 µm, for example at least 150 µm; it is generally at most 300 µm and preferably lies between 100 and 270 µm, in particular between 200 and 260 µm. This mean size is determined according to Standard NF X 11507 (December 1970) by dry sieving and determination of the corresponding diameter at a cumulative oversize of 50%.

The silicas according to the invention can also be provided in the form of a powder, generally with a mean size of at least 3 µm, in particular of at least 10 µm, for example of at least 15 µm; the latter can be between 15 and 60 µm (in particular between 20 and 45 µm) or between 30 and 150 µm (in particular between 45 and 120 µm).

They can also be provided in the form of granules (generally of substantially parallelepipedal shape), in particular with a size of at least 1 mm, for example of between 1 and 10 mm, in particular along the axis of their greatest dimension (length).

The silicas according to the invention are preferably prepared according to the preparation process in accordance with the invention which is described above, in particular according to the preferred embodiment of the said process.

The precipitated silica according to the invention or prepared by the process according to the invention, in particular by the preferred embodiment of the said process, has a particularly advantageous application in the reinforcing of natural or synthetic polymers.

The polymer compositions in which it is used, in particular as reinforcing filler, are generally based on one or more polymers or copolymers, in particular on one or more elastomers, especially thermoplastic elastomers, preferably exhibiting at least one glass transition temperature of between −150 and +300° C., for example between −150 and +20° C.

Mention may be made, as possible polymers, of diene polymers, in particular diene elastomers.

For example, use may be made of the polymers or copolymers deriving from aliphatic or aromatic monomers comprising at least one unsaturation (such as, in particular, ethylene, propylene, butadiene, isoprene or styrene), polybutyl acrylate or their blends; mention may also be made of silicone elastomers, functionalized elastomers (for example functionalized by functional groups capable of reacting with the surface of the silica) and halogenated polymers. Mention may be made of polyamides.

The polymer (copolymer) can be a bulk polymer (copolymer), a polymer (copolymer) latex or else a solution of polymer (copolymer) in water or in any other appropriate dispersing liquid.

Mention may be made, as diene elastomers, for example, of polybutadienes (BR), polyisoprenes (IR), butadiene copolymers, isoprene copolymers or their blends and in particular styrene/butadiene copolymers (SBR, in particular ESBR (emulsion) or SSBR (solution)), isoprene/butadiene copolymers (BIR), isoprene/styrene copolymers (SIR), isoprene/butadiene/styrene copolymers (SBIR) or ethylene/propylene/diene terpolymers (EPDM).

Mention may also be made of natural rubber (NR).

The polymer compositions can be vulcanized with sulphur (vulcanisates are then obtained) or crosslinked, in particular with peroxides.

Generally, the polymer compositions additionally comprise at least one coupling (silica/polymer) agent and/or at least one coating agent; they can also comprise, inter alia, an antioxidant.

Use may in particular be made, as coupling agents, as nonlimiting examples, of "symmetrical" or "asymmetrical" silane polysulphides; mention may more particularly be made of bis(($C_1$-$C_4$)alkoxy($C_1$-$C_4$)alkylsilyl($C_1$-$C_4$)alkyl) polysulphides (in particular disulphides, trisulphides or tetrasulphides), such as, for example, bis(3-(trimethoxysilyl)propyl) polysulphides or bis(3-(triethoxysilyl)propyl) polysulphides. Mention may also be made of monoethoxydimethylsilylpropyl tetrasulphide.

The coupling agent can be grafted beforehand to the polymer.

It can also be employed in the free state (that is to say, not grafted beforehand) or grafted at the surface of the silica. It is the same for the optional coating agent.

The use of a precipitated silica according to the invention or prepared by the process according to the invention can make it possible to substantially reduce, for example of the order of 20%, the amount of coupling agent to be employed in silica-reinforced polymer compositions, while maintaining a substantially identical compromise in properties.

The coupling agent can optionally be combined with an appropriate "coupling activator", that is to say a compound which, mixed with this coupling agent, increases the effectiveness of the latter.

The proportion by weight of precipitated silica in the polymer composition can vary within a fairly wide range. It usually represents from 20 to 80%, for example from 30 to 70%, of the amount of the polymer(s).

The precipitated silica according to the invention can advantageously constitute all of the reinforcing inorganic filler and even all of the reinforcing filler of the polymer composition.

However, this precipitated silica according to the invention can optionally be combined with at least one other reinforcing filler, such as in particular a commercial highly dispersible silica, such as, for example, Z1165MP or Z1115MP, a treated precipitated silica (for example a precipitated silica "doped" using a cation, such as aluminium), another reinforcing inorganic filler, such as, for example, alumina, indeed even a reinforcing organic filler, in particular carbon black (optionally coated with an inorganic layer, for example silica). The precipitated silica according to the invention then preferably constitutes at least 50%, indeed even at least 80%, by weight of all of the reinforcing filler.

Mention may be made, as nonlimiting examples of finished articles based on the polymer compositions described above (in particular based on the vulcanisates mentioned above), of footwear soles (preferably in the presence of a coupling (silica/polymer) agent, for example monoethoxydimethylsilylpropyl tetrasulphide), floor coverings, gas barriers, flame-retardant materials and also engineering components, such as cableway rollers, seals for domestic appliances, seals for liquid or gas pipes, braking system seals, sheaths, cables and driving belts.

Use may be made, for footwear soles, advantageously in the presence of a coupling (silica/polymer) agent, for example monoethoxydimethylsilylpropyl tetrasulphide, of polymer compositions based, for example, on natural rubber (NR), polyisoprene (IR), polybutadiene (BR), styrene/butadiene copolymer (SBR) or butadiene/acrylonitrile copolymer (NBR).

Use may be made, for engineering components, for example in the presence of a coupling (silica/polymer) agent, of polymer compositions based, for example, on natural rubber (NR), polyisoprene (IR), polybutadiene (BR), styrene/butadiene copolymer (SBR), polychloroprene, butadiene/acrylonitrile copolymer (NBR), hydrogenated or carboxylated nitrile rubber, isobutylene/isoprene copolymer (IIR), halogenated (in particular brominated or chlorinated) butyl rubber, ethylene/propylene copolymer (EPM), ethylene/propylene/diene terpolymer (EPDM), chlorinated polyethylene, chlorosulphonated polyethylene, matrices based on silicone(s) (in particular high temperature or room temperature vulcanisable silicone elastomer matrices), epichlorohydrin rubber, fluorocarbon rubber or polyacrylates.

The precipitated silica according to the invention or prepared by the process according to the invention can also be employed as catalyst support, as absorbent for active materials (in particular support for liquids, for example used in the food industry, such as vitamins (vitamin E) or choline chloride), as viscosifying, texturing or anticaking agent, as component for battery separators, as dentifrice additive or as paper additive.

The following examples illustrate the invention without, however, limiting the scope thereof.

EXAMPLE 1

The following are introduced in a 25 litre stainless steel reactor equipped with a propeller stirring system and jacket heating:

7.2 litres of water 4050 grams of aqueous sodium silicate exhibiting an $SiO_2$/$Na_2O$ ratio by weight equal to 3.45 and having a concentration of 235 g/l 125 grams of sodium sulphate $Na_2SO_4$ (electrolyte).

The silicate concentration (expressed as $SiO_2$) in the vessel heel is then 74 g/l.

The mixture is homogenized by stirring and brought to 82° C. The entire reaction is carried out with stirring (300 rev/min, propeller stirring).

Sulphuric acid with a concentration equal to 80 g/l is introduced into the mixture at a flow rate of 80 g/min until the pH of the reaction medium reaches a value of 8 (i.e., 4380 grams of sulphuric acid in 55 minutes approximately). After adding sulphuric acid for 30 minutes, the temperature of the reaction medium is brought to 94° C.

Once acidification has been completed, the following are introduced simultaneously into the reaction medium over 30 minutes: a sodium silicate solution (with an $SiO_2/Na_2O$ ratio by weight equal to 3.45) having a concentration of 235 g/l at a flow rate of 34 g/min and sulphuric acid having a concentration of 80 g/l at a flow rate adjusted so as to maintain the pH of the reaction medium at a value of 8.

On completion of the 30 minutes of simultaneous addition, sulphuric acid having a concentration of 80 g/l is introduced at a flow rate of 80 g/min until the pH of the reaction medium reaches a value of 3 (i.e., 1288 grams of sulphuric acid in 16 minutes approximately).

The following are subsequently introduced simultaneously into the reaction medium over 15 minutes: a sodium silicate solution (with an $SiO_2/Na_2O$ ratio by weight equal to 3.45) having a concentration of 235 g/l at a flow rate of 34 g/min and sulphuric acid having a concentration of 80 g/l at a flow rate adjusted so as to maintain the pH of the reaction medium at a value of 3.

On completion of the 15 minutes of this second simultaneous addition, a sodium silicate solution of the type described above is introduced at a flow rate of 34 g/min so as to bring the pH of the reaction medium back to 5.2 (i.e., 783 grams of silicate solution in 23 minutes).

On conclusion of the reaction, a precipitated silica reaction slurry is obtained and is kept stirred at a temperature of 94° C. for 5 minutes. After this maturing, the precipitated silica slurry is recovered by emptying the reactor.

The slurry is filtered and washed under vacuum (solids content of 14% by weight). The filtration cake obtained is washed 4 times with 5 litres of water. It is subsequently resuspended by mechanical disintegration in the presence of water and sodium aluminate ($Al/SiO_2$ ratio by weight of 0.3%). The resulting slurry (solids content of 10% by weight) is dried using a rotary atomizer.

The characteristics of the precipitated silica P1 obtained (in the powder form) are then as follows:

CTAB specific surface: 192 m²/g
BET specific surface: 220 m²/g
d50 median size of aggregates: 61 nm
$V_{(d5-d50)}/V_{(d5-d100)}$: 0.73
Mode (Hg porosimetry): 14.7 nm
C(SAXS): 0.350
$D_{50M}$ (after ultrasonic deagglomeration): 2.4 μm
α: 0.045 μm$^{-1}$·min$^{-1}$
$N_{SiOH/nm2}$: 5.0
pH: 7.3

It is found, in particular by TEM, that the precipitated silica P1 is formed of aggregates of large silica primary particles (lpp) with a number median diameter of 13.5 nm, at the surface of which small silica primary particles (spp), with a number median diameter of 3.9 nm, occur.

EXAMPLE 2

The following are introduced into a 2000 litre stainless steel reactor equipped with a propeller stirring system and jacket heating:

593 litres of water
329 litres of aqueous sodium silicate exhibiting an $SiO_2/Na_2O$ ratio by weight equal to 3.45 and having a concentration of 235 g/l
13.4 kg of sodium sulphate $Na_2SO_4$ (electrolyte).

The silicate concentration (expressed as $SiO_2$) in the vessel heel is then 75 g/l.

The mixture is homogenized by stirring and brought to 95° C. The entire reaction is carried out with stirring (80 rev/min).

Sulphuric acid with a concentration equal to 80 g/l is introduced into the mixture at a flow rate of 490 l/h for 15 minutes and then at a flow rate of 1480 l/h until the pH of the reaction medium reaches a value of 8.

Once acidification has been completed, the following are introduced simultaneously in the reaction medium over 20 minutes: a sodium silicate solution (with an $SiO_2/Na_2O$ ratio by weight equal to 3.45) having a concentration of 235 g/l at a flow rate of 198 l/h and sulphuric acid having a concentration of 80 g/l at a flow rate adjusted so as to maintain the pH of the reaction medium at a value of 8.

At the end of the 20 minutes of simultaneous addition, sulphuric acid having a concentration of 80 g/l is introduced at a flow rate of 400 l/h until the pH of the reaction medium reaches a value of 4.

The following are subsequently introduced simultaneously into the reaction medium over 85 minutes: a sodium silicate solution (with an $SiO_2/Na_2O$ ratio by weight equal to 3.45) having a concentration of 235 g/l at a flow rate of 85 l/h and sulphuric acid having a concentration of 80 g/l at a flow rate adjusted so as to maintain the pH of the reaction medium at a value of 4.

At the end of the 85 minutes of this second simultaneous addition, a sodium silicate solution of the type described above is introduced at a flow rate of 97 l/h so as to bring the pH of the reaction medium back to 5.2.

On conclusion of the reaction, a precipitated silica reaction slurry is obtained and is kept stirred at a temperature of 95° C. for 5 minutes. After this maturing, the precipitated silica slurry is recovered by emptying the reactor.

The slurry is filtered through a filter press (solids content of 25% by weight). The filtration cake obtained is resuspended by mechanical disintegration in the presence of water and sodium aluminate ($Al/SiO_2$ ratio by weight of 0.3%). The resulting slurry is subsequently dried using a nozzle atomizer.

The characteristics of the precipitated silica P2 obtained (in the form of substantially spherical beads) are then as follows:

CTAB specific surface: 151 m²/g
BET specific surface: 189 m²/g
d50 median size of aggregates: 78 nm
$V_{(d5-d50)}/V_{(d5-d100)}$: 0.75
Mode (Hg porosimetry): 23.0 nm
C(SAXS): 0.640
$D_{50M}$ (after ultrasonic deagglomeration): 2.2
α: 0.031 μm$^{-1}$·min$^{-1}$
$N_{SiOH/nm2}$: 4.8
pH: 6.6

It is found, in particular by TEM, that the precipitated silica P2 is formed of aggregates of large silica primary particles (lpp) with a number median diameter of 18.3 nm, at the surface of which small silica primary particles (spp), with a number median diameter of 4.3 nm, occur.

EXAMPLE 3

The following are introduced into a 25 litre stainless steel reactor equipped with a propeller stirring system and jacket heating:

7.91 litres of water 4286 grams of aqueous sodium silicate exhibiting an $SiO_2/Na_2O$ ratio by weight equal to 3.45 and having a concentration of 235 g/l 134 grams of sodium sulphate $Na_2SO_4$ (electrolyte).

The silicate concentration (expressed as $SiO_2$) in the vessel heel is then 72 g/l.

The mixture is homogenized by stirring and brought to 92° C. The entire reaction is carried out with stirring (300 rev/min, propeller stirring).

Sulphuric acid with a concentration equal to 80 g/l is introduced into the mixture at a flow rate of 146 g/min until the pH of the reaction medium reaches a value of 8 (i.e., 4380 grams of sulphuric acid in 30 minutes approximately).

Once acidification has been completed, the following are simultaneously introduced into the reaction medium over 25 minutes: a sodium silicate solution (with an $SiO_2/Na_2O$ ratio by weight equal to 3.45) having a concentration of 235 g/l at a flow rate of 32 g/min and sulphuric acid having a concentration of 80 g/l at a flow rate adjusted so as to maintain the pH of the reaction medium at a value of 8.

At the end of the 30 minutes of simultaneous addition, sulphuric acid having a concentration of 80 g/l is introduced at a flow rate of 80 g/min until the pH of the reaction medium reaches a value of 4 (i.e., 418 grams of sulphuric acid in 5 minutes approximately).

The following are subsequently introduced simultaneously into the reaction medium over 140 minutes: a sodium silicate solution (with an $SiO_2/Na_2O$ ratio by weight equal to 3.45) having a concentration of 235 g/l at a flow rate of 19 g/min and sulphuric acid having a concentration of 80 g/l at a flow rate adjusted so as to maintain the pH of the reaction medium at a value of 4.

At the end of the 140 minutes of this second simultaneous addition, a sodium silicate solution of the type described above is introduced at a flow rate of 19 g/min so as to bring the pH of the reaction medium back to 5.2 (i.e., 98 grams of silicate solution in 5 minutes).

On conclusion of the reaction, a precipitated silica reaction slurry is obtained and is kept stirred at a temperature of 94° C. for 5 minutes. After this maturing, the precipitated silica slurry is recovered by emptying the reactor.

The slurry is filtered and washed under vacuum (solids content of 18% by weight). The filtration cake obtained is washed 4 times with 5 litres of water. It is subsequently resuspended by mechanical disintegration in the presence of water and sodium aluminate ($Al/SiO_2$ ratio by weight of 0.3%). The resulting slurry (solids content of 10% by weight) is dried using a rotary atomizer.

The characteristics of the precipitated silica P3 obtained (in the powder form) are then as follows:

CTAB specific surface: 183 m$^2$/g
BET specific surface: 240 m$^2$/g
d50 median size of aggregates: 83 nm
$V_{(d5-d50)}/V_{(d5-d100)}$: 0.81
Mode (Hg porosimetry): 20.5 nm
C(SAXS): 0.466
$D_{50M}$ (after ultrasonic deagglomeration): 3.5 μM
α: 0.032 μm$^{-1}$·min$^{-1}$
$N_{SiOH/nm2}$: 3.9
pH: 6.5

It is found, in particular by TEM, that the precipitated silica P3 is formed of aggregates of large silica primary particles (lpp) with a number median diameter of 22.0 nm, at the surface of which small silica primary particles (spp), with a number median diameter of 3.9 nm, occur.

EXAMPLE 4

The following are introduced in a 25 litre stainless steel reactor equipped with a propeller stirring system and jacket heating:

6.0 litres of water
4833 grams of aqueous sodium silicate exhibiting an $SiO_2/Na_2O$ ratio by weight equal to 3.45 and having a concentration of 235 g/l
157.5 grams of sodium sulphate $Na_2SO_4$ (electrolyte).

The silicate concentration (expressed as $SiO_2$) in the vessel heel is then 93 g/l.

The mixture is homogenized by stirring and brought to 94° C. The entire reaction is carried out with stirring (300 rev/min, propeller stirring).

Sulphuric acid with a concentration equal to 80 g/l is introduced into the mixture at a flow rate of 104 g/min until the pH of the reaction medium reaches a value of 8 (i.e., 4794 grams of sulphuric acid in 46 minutes approximately).

Once acidification has been completed, the following are introduced simultaneously into the reaction medium over 15 minutes: a sodium silicate solution (with an $SiO_2/Na_2O$ ratio by weight equal to 3.45) having a concentration of 235 g/l at a flow rate of 80 g/min and sulphuric acid having a concentration of 80 g/l at a flow rate adjusted so as to maintain the pH of the reaction medium at a value of 8.

On completion of the 15 minutes of simultaneous addition, sulphuric acid having a concentration of 80 g/l is introduced at a flow rate of 80 g/min until the pH of the reaction medium reaches a value of 4 (i.e., 597 grams of sulphuric acid in 7 minutes approximately).

The following are subsequently introduced simultaneously into the reaction medium over 53 minutes: a sodium silicate solution (with an $SiO_2/Na_2O$ ratio by weight equal to 3.45) having a concentration of 235 g/l at a flow rate of 15 g/min and sulphuric acid having a concentration of 80 g/l at a flow rate adjusted so as to maintain the pH of the reaction medium at a value of 4.

On completion of the 53 minutes of this second simultaneous addition, a sodium silicate solution of the type described above is introduced at a flow rate of 15 g/min so as to bring the pH of the reaction medium back to 5.2 (i.e., 91 grams of silicate solution in 6 minutes).

On conclusion of the reaction, a precipitated silica reaction slurry is obtained and is kept stirred at a temperature of 94° C. for 5 minutes. After this maturing, the precipitated silica slurry is recovered by emptying the reactor.

The slurry is filtered and washed under vacuum (solids content of 14% by weight). The filtration cake obtained is washed 4 times with 5 litres of water. It is subsequently resuspended by mechanical disintegration in the presence of water and sodium aluminate ($Al/SiO_2$ ratio by weight of 0.3%). The resulting slurry (solids content of 10% by weight) is dried using a rotary atomizer.

The characteristics of the precipitated silica P4 obtained (in the powder form) are then as follows:

CTAB specific surface: 96 m$^2$/g
BET specific surface: 126 m$^2$/g
d50 median size of aggregates: 163 nm
$V_{(d5-d50)}/V_{(d5-d100)}$: 0.86
Mode (Hg porosimetry): 72.0 nm
C(SAXS): 0.686
$D_{50M}$ (after ultrasonic deagglomeration): 4.6 μm
pH: 7.3

It is found, in particular by TEM, that the precipitated silica P4 is formed of aggregates of large silica primary particles (lpp) with a number median diameter of 29.0 nm, at the surface of which small silica primary particles (spp), with a number median diameter of 4.2 nm, occur.

EXAMPLE 5

Properties in a Rubber Matrix

The evaluation in a rubber matrix relates to:
a first formulation of sSBR type where the silica of the present invention (prepared in Example 2) is compared with a commercial control silica (Z1165MP) with the same amount of silica involved (80 pce or parts by weight in load of elastomer) and then with the same hardness,
a second formulation of EPDM type where the silica of the present invention (prepared in Example 2) is compared with a commercial control silica (Z1165MP) with the same amount of silica involved (40 pce or parts by weight in load of elastomer) and then with the same hardness.

The control silica Z1165MP used exhibits the following characteristics:
Z1165MP
CTAB specific surface: 156 m²/g
BET specific surface: 162 m²/g
d50 median size of aggregates: 47 nm
$V_{(d5-d50)}/V_{(d5-d100)}$: 0.67
Mode (Hg porosimetry): 15.3 nm
C(SAXS): 0.247
$D_{50M}$ (after ultrasonic deagglomeration): 3.5 μm
A—Evaluation in an sSBR Matrix with the Same Amount of Silica Involved
Composition of the Elastomeric Compositions
Elastomeric compositions, the composition of which, expressed as parts by weight (pce), is shown in Table I below, are prepared in an internal mixer of Haake type.

TABLE I

Formulations used for the blends

| Compositions | Control 1 | Composition 1 |
|---|---|---|
| SBR (1) | 137.5 | 137.5 |
| Silica 1 (2) | 80 | |
| Silica 2 (3) | | 80 |
| Coupling agent (4) | 6.4 | 6.4 |
| ZnO | 2.5 | 2.5 |
| Stearic acid | 2 | 2 |
| Antioxidant (5) | 1.9 | 1.9 |
| DPG (6) | 1.5 | 1.7 |
| CBS (7) | 2 | 2 |
| TBzTD (8) | 0.2 | 0.2 |
| Sulphur | 1.1 | 1.1 |

(1) SBR solution (Buna VSL5025-1 from Lanxess) with 50 +/− 4% of vinyl units; 25 +/− 2% of styrene units; Tg in the vicinity of −20° C.; 100 phr of SBR extended with 37.5 +/− 2.8% by weight of oil
(2) Silica Z1165 MP from Rhodia
(3) Silica according to the present invention (Example 2 above)
(4) TESPT (Z-6940 from Dow Corning)
(5) N-1,3-Dimethylbutyl-N-phenyl-para-phenylenediamine (Santoflex 6-PPD from Flexsys)
(6) Diphenylguanidine (Rheonogran DPG-80 from RheinChemie)
(7) N-Cyclohexyl-2-benzothiazolesulphenamide (Rhénogran CBS-80 from RheinChemie)
(8) Tetrabenzylthiuram disulphide (Rhenogran TBzTD-70 from RheinChemie).

Preparation Process

Each of the elastomeric compositions is prepared in two successive phases. A first phase, referred to as the non-productive phase, makes possible high temperature thermomechanical working (until a maximum temperature of between 130 and 160° C. is achieved). It is followed by a second phase of mechanical working at temperatures below 110° C.; this phase makes possible the introduction of the vulcanization system.

The first phase is carried out in an internal mixer of Haake type (capacity of 300 ml). The filling coefficient is 0.75. The initial temperature and the speed of the rotors are set on each occasion so as to achieve blend dropping temperatures in the vicinity of 130-160° C.

Broken down here into two passes, this phase makes it possible to incorporate, in a first pass, the elastomer and then the silica (introduction in installments) with the coupling agent and the stearic acid. For this pass, the duration is between 2 and 10 minutes.

After cooling the blend (temperature below 100° C.), a second pass makes it possible to incorporate the zinc oxide and the antioxidant. For this pass, the duration is between 2 and 5 minutes.

After cooling the blend (temperature below 100° C.), the second phase, referred to as the productive phase, makes possible the introduction of the vulcanization system (sulphur and DPG, CBS and TBzTD accelerators). It is carried out on an open mill preheated to 50° C. The duration of this phase is between 5 and 10 minutes.

Each final blend is subsequently calendered in the form of sheets with a thickness of 2-3 mm.

An evaluation of the rheological properties of the "uncured" blends obtained makes it possible to measure the uncured viscosity and to optimize the vulcanization time and temperature.

Subsequently, the mechanical and dynamic properties of the optimally vulcanized blends are measured.

Rheological Properties

Viscosity of the Uncured Blends

The Mooney consistency is measured on the compositions in the uncured state at 100° C. using an MV 2000 rheometer according to Standard NF T 43 005.

The value of the torque read at the end of 4 minutes after preheating for one minute (Mooney Large (1+4) at 100° C.) is shown in Table II.

TABLE II

| Compositions | Control 1 | Composition 1 |
|---|---|---|
| ML(1 + 4) - 100° C. | 94 | 96 |

It is found that composition 1, comprising a silica according to the present invention, exhibits an uncured viscosity in the vicinity of that of the control composition comprising a silica with a similar CTAB specific surface.

Rheometry of the Compositions

The measurements are carried out on the compositions in the uncured state. The results relating to the rheology test, which is carried out at 160° C. using a Monsanto 100 S ODR rheometer according to Standard DIN 53529, have been recorded in Table III.

According to this test, each test composition is placed in the test chamber adjusted to a temperature of 160° C. for 30 minutes and the resistive torque opposed by the composition to a low-amplitude oscillation (3°) of a biconical rotor included in the test chamber is measured, the composition completely filling the chamber under consideration.

The following are determined from the curve of variation of the torque as a function of time:

the minimum torque (Tm), which illustrates the viscosity of the composition at the temperature under consideration (160° C.), the maximum torque (TM), Ts2 (or scorch time), which corresponds to the time necessary in order to have a rise of 2 points above the minimum torque at the temperature under consideration (160° C.) and reflects the time during which control of the mixing is possible, that is to say the time during which it is possible to process the uncured blend at this temperature without having initiation of vulcanization (the blend cures from Ts2), T90, which corresponds to the time at the end of which 90% of the complete vulcanization has been carried out, Rcross_max, which illustrates the crosslinking rate.

The results obtained are shown in Table III.

TABLE III

| Compositions | Control 1 | Composition 1 |
|---|---|---|
| Tm (dN · m) | 17.1 | 15.9 |
| TM (dN · m) | 62.5 | 56.6 |
| Ts2 (min) | 4.8 | 5.0 |
| T90 (min) | 17.5 | 15.4 |
| Rcross_max (dN · m/min) | 4.9 | 5.3 |

It is found that composition 1, which comprises a silica according to the invention, exhibits a very satisfactory combination of rheological properties, in particular in comparison with the control composition.

In particular, it exhibits lower values for minimum and maximum torques than those of the control composition, which reflects a greater ease of processing of the blend prepared.

In particular, the silica according to the invention makes it possible to obtain improved vulcanization kinetics (Ts2, T90 and Rcross_max) in comparison with those obtained with the control silica, without damaging the viscosity of the uncured blend (illustrated in particular by the minimum torque).

Mechanical Properties of the Vulcanisates

The measurements are carried out on optimally vulcanized compositions (t98 (time necessary in order to obtain a vulcanization state corresponding to 98% of complete vulcanization)) for a temperature of 160° C.

Uniaxial tensile tests (100% and 300% moduli) are carried out in accordance with the instructions of Standard NF T 46002 with test specimens of H2 type at a rate of 500 mm/min on an Instron 5564 device.

The x % moduli correspond to the stress measured at x % of tensile strain.

The properties measured are collated in Table IV.

TABLE IV

| Compositions | Control 1 | Composition 1 |
|---|---|---|
| 100% Modulus (MPa) | 2.98 | 2.47 |
| 300% Modulus (MPa) | 15.4 | 14.1 |
| 300% Modulus/100% Modulus | 5.2 | 5.7 |

It is found that the silica according to the invention exhibits a satisfactory reinforcing nature and confers, in terms of moduli, a mechanical behaviour on the elastomeric composition comparable to that conferred by the control silica.

Dynamic Properties of the Vulcanisates

The dynamic properties are measured on a viscosity analyser (Metravib VA3000) according to Standard ASTM D5992 in compression mode.

The values for loss factor (tan δ) and compressive dynamic complex modulus (E*) are recorded on vulcanized samples (cylindrical test specimen with a cross section of 95 mm$^2$ and a height of 14 mm). The sample is subjected at the start to a 10% prestrain and then to a sinusoidal strain in alternating compression of +/−2%. The measurements are carried out at 60° C. and at a frequency of 10 Hz.

The results, presented in Table V, are the compressive complex modulus (E*, 60° C., 10 Hz) and the loss factor (tan δ, 60° C., 10 Hz).

TABLE V

| Compositions | Control 1 | Composition 1 |
|---|---|---|
| E*, 60° C., 10 Hz | 8.72 | 5.90 |
| Tan δ, 60° C., 10 Hz | 0.137 | 0.096 |

The values for the loss factor (tan δ) and for amplitude of the dynamic shear elastic modulus (ΔG') are recorded on vulcanized samples (parallelepipedal test specimen with a cross section of 8 mm$^2$ and a height of 7 mm). The sample is subjected to a double alternating sinusoidal shear strain at a temperature of 40° C. and at a frequency of 10 Hz. The strain amplitude sweeping process is carried out according to an outward-return cycle, proceeding outward from 0.1 to 50% and then returning from 50 to 0.1%.

The results, presented in Table VI, result from the return strain amplitude sweep and relate to the maximum value of the loss factor (tan δ max return, 10 Hz) and to the amplitude of the elastic modulus (ΔG', 10 Hz) between the values of 0.1% and 50% strain (Payne effect).

TABLE VI

| Compositions | Control 1 | Composition 1 |
|---|---|---|
| Tan δ max return, 40° C., 10 Hz | 0.302 | 0.201 |
| ΔG', 40° C., 10 Hz (MPa) | 3.20 | 1.45 |

Composition 1, comprising the silica according to the invention, exhibits good dynamic properties which also prove to be particularly advantageous for the properties of the finished articles based on this composition.

Thus, it is found that, at 40° C. and 60° C., the value of the loss factor or tangent δ (which reflects the energy absorbed or restored by the vulcanisate when subjected to a strain under the test conditions mentioned) obtained for composition 1 comprising the silica according to the present invention is improved in comparison with what is obtained for the control composition, independently of the mode of dynamic stresses.

A significant reduction in the nonlinearity at 40° C., associated with the Payne effect (ΔG'), is also found with the silica according to the invention.

Thus, the silica according to the present invention makes it possible to obtain a highly satisfactory compromise in rheological, mechanical and dynamic properties, in particular hysteresis properties, in particular a highly satisfactory hysteresis/reinforcing compromise, in particular in comparison with the control silica.

B—Evaluation in an sSBR Matrix with the Same Hardness

Composition of the Elastomeric Compositions

Elastomeric compositions, the composition of which, expressed as parts by weight (pce), is shown in Table VII below, are prepared in an internal mixer of Haake type.

TABLE VII

Formulations used for the blends

| Compositions   | Control 1 | Composition 2 |
|----------------|-----------|---------------|
| SBR (1)        | 137.5     | 137.5         |
| Silica 1 (2)   | 80        |               |
| Silica 3 (3)   |           | 95            |
| Coupling agent (4) | 6.4   | 7.2           |
| ZnO            | 2.5       | 2.5           |
| Stearic acid   | 2         | 2             |
| Antioxidant (5)| 1.9       | 1.9           |
| DPG (6)        | 1.5       | 2.1           |
| CBS (7)        | 2         | 2             |
| TBzTD (8)      | 0.2       | 0.2           |
| Sulphur        | 1.1       | 1.1           |

(1) SBR solution (Buna VSL5025-1 from Lanxess) with 50 +/− 4% of vinyl units; 25 +/− 2% of styrene units; Tg in the vicinity of −20° C.; 100 phr of SBR extended with 37.5 +/− 2.8% by weight of oil
(2) Silica Z1165 MP from Rhodia
(3) Silica according to the present invention (Example 2 above)
(4) TESPT (Z-6940 from Dow Corning)
(5) N-1,3-Dimethylbutyl-N-phenyl-para-phenylenediamine (Santoflex 6-PPD from Flexsys)
(6) Diphenylguanidine (Rheogran DPG-80 from RheinChemie)
(7) N-Cyclohexyl-2-benzothiazolesulphenamide (Rhénogran CBS-80 from RheinChemie)
(8) Tetrabenzylthiuram disulphide (Rhenogran TBzTD-70 from RheinChemie).

Preparation Process

The process for the preparation of each of the elastomeric compositions is identical to that described above.

An evaluation of the rheological properties of the "uncured" blends obtained makes it possible to measure the uncured viscosity and to optimize the vulcanization time and temperature.

Subsequently, the mechanical and dynamic properties of the optimally vulcanized blends are measured.

Rheological Properties

Viscosity of the Uncured Blends

As above, the Mooney consistency is measured on the compositions in the uncured state at 100° C. using an MV 2000 rheometer according to Standard NF T 43 005.

The value of the torque read at the end of 4 minutes after preheating for one minute (Mooney Large (1+4) at 100° C.) is shown in Table VIII.

TABLE VIII

| Compositions | Control 1 | Composition 2 |
|--------------|-----------|---------------|
| ML (1 + 4), 100° C. | 94 | 104 |

It is found that the increase in the degree of charging of the silica of the present invention (composition 2) does not result in an excessively large increase in the uncured viscosity in comparison with control composition 1.

Rheometry of the Compositions

The measurements are carried out as above at a temperature of 160° C. for 30 minutes using a Monsanto 100 S ODR rheometer according to Standard DIN 53529.

The results obtained are shown in Table IX.

TABLE IX

| Compositions | Control 1 | Composition 2 |
|--------------|-----------|---------------|
| Tm (dN · m) | 17.1 | 17.9 |
| TM (dN · m) | 62.5 | 58.2 |
| Ts2 (min) | 4.8 | 4.3 |
| T90 (min) | 17.5 | 18.2 |
| Rcross_max (dN · m/min) | 4.9 | 4.6 |

It is found that the increase in the degree of charging of the silica of the present invention (composition 2) in comparison with the control blend does not result in excessive deteriorations in the rheometric properties.

Mechanical Properties of the Vulcanisates

The measurements are carried out on optimally vulcanized compositions (t98) for a temperature of 160° C.

The uniaxial tensile tests (100% and 200% moduli) are carried out as above (Standard NF T 46002).

The measurement of Shore A hardness of the vulcanisates is carried out according to the instructions of Standard ASTM D2240. The value given is measured at 15 seconds.

The properties measured are collated in Table X.

TABLE X

| Compositions | Control 1 | Composition 2 |
|--------------|-----------|---------------|
| 100% Modulus (MPa) | 2.98 | 3.18 |
| 200% Modulus (MPa) | 8.28 | 9.97 |
| 200% Modulus/100% Modulus | 2.8 | 3.1 |
| Shore A hardness - 15 s (pts) | 63 | 62 |

It is found that an increase in the degree of charging of the silica according to the present invention (composition 2) makes it possible to achieve a hardness comparable to that of the control composition while conferring a highly satisfactory reinforcing nature, in particular one which is improved in comparison with that obtained with the control silica.

Dynamic Properties of the Vulcanisates

The dynamic properties are measured as above using a viscosity analyser (Metravib VA3000) according to Standard ASTM D5992 in compression mode.

The results, presented in Table XI, are the compressive complex modulus ($E^*$, 60° C., 10 Hz) and the loss factor (tan δ, 60° C., 10 Hz).

TABLE XI

| Compositions | Control 1 | Composition 2 |
|--------------|-----------|---------------|
| $E^*$, 60° C., 10 Hz | 8.72 | 6.94 |
| Tan δ, 60° C., 10 Hz | 0.137 | 0.110 |

The dynamic properties in shear mode are then measured as above using a viscosity analyser (Metravib VA3000) according to Standard ASTM D5992 and the results are shown in Table XII.

TABLE XII

| Compositions | Control 1 | Composition 2 |
|--------------|-----------|---------------|
| Tan δ max return, 40° C., 10 Hz | 0.302 | 0.230 |
| ΔG', 40° C., 10 Hz | 3.20 | 2.05 |

Composition 2, comprising the silica according to the invention, exhibits good dynamic properties which also prove to be particularly advantageous for the properties of the finished articles based on this composition.

It is also found that, at 40° C. and 60° C., the value of the loss factor or tangent δ (which reflects the energy absorbed or restored by the vulcanisate when subjected to a strain under the test conditions mentioned) obtained for composition 2 comprising the silica according to the present invention is improved in comparison with what is obtained for the control composition, independently of the mode of dynamic stresses.

A significant reduction in the nonlinearity at 40° C., associated with the Payne effect (ΔG'), is also found with the silica according to the invention.

Thus, the silica according to the present invention makes it possible to obtain a highly satisfactory compromise in rheological, mechanical and dynamic properties, in particular hysteresis properties, in particular a highly satisfactory hysteresis/reinforcing compromise, in particular in comparison with the control silica.

C—Evaluation in an EPDM Matrix

Composition of the Elastomeric Compositions

Elastomeric compositions, the composition of which, expressed as parts by weight (pce), is shown in Table XIII below, are prepared in an internal mixer of Haake type.

TABLE XIII

Formulations used for the blends

| Compositions | Control 4 | Comp. 3 | Comp. 4 |
|---|---|---|---|
| EPDM (1) | 100 | 100 | 100 |
| Silica 1 (2) | 40 | | |
| Silica 3 (3) | | 40 | 48 |
| Coupling agent (4) | 1.6 | 1.5 | 1.8 |
| Oil (5) | 20 | 20 | 20 |
| ZnO | 4.0 | 4.0 | 4.0 |
| Stearic acid | 2 | 2 | 2 |
| Antioxidant (6) | 1 | 1 | 1 |
| MBI (7) | 1 | 1 | 1 |
| MBT (8) | 1.1 | 1.1 | 1.1 |
| ZDBC (9) | 1.1 | 1.1 | 1.1 |
| TBzTD (10) | 1.6 | 1.6 | 1.6 |
| Sulphur | 1.9 | 1.9 | 1.9 |

(1) EPDM (Vistalon 2504 from Exxon Mobil Chemical with 57.5% of ethylene units and 4.7% of ENB (ethylidenenorbornene) units)
(2) Silica Z1165 MP from Rhodia
(3) Silica according to the present invention (Example 2 above)
(4) TESPT (Z-6940 from Dow Corning)
(5) Liquid paraffin (Sunpar 2280 from Sun Oil Company Alcan)
(6) N-1,3-Dimethylbutyl-N-phenyl-para-phenylenediamine (Santoflex 6-PPD from Flexsys)
(7) 2-Mercaptobenzimidazole (Vulkanox MB/MG from Lanxess)
(8) 2-Mercaptobenzothiazole (Rhénogran MBT-80 from RheinChemie)
(9) Zinc dibutyldithiocarbamate (Rhénogran ZDBC-80 from RheinChemie)
(10) Tetrabenzylthiuram disulphide (Rhénogran TBzTD-70 from RheinChemie).

Preparation Process

Each of the elastomeric compositions is prepared in two successive phases. A first phase, referred to as the non-productive phase, makes possible high temperature thermomechanical working (until a maximum temperature of between 130 and 160° C. is achieved). It is followed by a second phase of mechanical working at temperatures below 110° C.; this phase makes possible the introduction of the vulcanization system.

The first phase is carried out in an internal mixer of Haake type (capacity of 300 ml). The filling coefficient is 0.75. The initial temperature and the speed of the rotors are set on each occasion so as to achieve blend dropping temperatures in the vicinity of 130-160° C.

This first phase makes it possible to incorporate the elastomer and then the silica (introduction in installments) with the coupling agent and the stearic acid and subsequently the zinc oxide, the antioxidant and the MBI. The duration of this phase is between 2 and 10 minutes.

After cooling the blend (temperature below 100° C.), the second phase, referred to as the productive phase, makes possible the introduction of the vulcanization system (sulphur and MBT, ZDBC, TBzTD accelerators). It is carried out on an open mill preheated to 50° C. The duration of this phase is between 5 and 10 minutes.

Each final blend is subsequently calendered in the form of sheets with a thickness of 2-3 mm.

An evaluation of the rheological properties of the "uncured" blends obtained makes it possible to measure the uncured viscosity and to optimize the vulcanization time and temperature.

Subsequently, the mechanical and dynamic properties of the optionally vulcanized blends are measured.

Rheological Properties

Viscosity of the Uncured Blends

As above, the Mooney consistency is measured on the compositions in the uncured state at 100° C. using an MV 2000 rheometer according to Standard NF T 43 005.

The value of the torque read at the end of 4 minutes after preheating for one minute (Mooney Large (1+4) at 100° C.) is shown in Table XIV.

TABLE XIV

| Compositions | Control 4 | Comp. 3 | Comp. 4 |
|---|---|---|---|
| ML (1 + 4), 100° C. | 46 | 43 | 51 |

It is found that:
- with the same amount of filler, composition 3, which comprises a silica according to the present invention, exhibits a lower uncured viscosity than that of the control composition, which comprises a silica with a similar specific surface,
- with the same hardness, composition 3, which comprises a silica according to the present invention, exhibits a viscosity similar to that of the control composition.

Rheometry of the Compositions

The measurements are carried out as above at a temperature of 160° C. for 30 minutes using a Monsanto 100 S ODR rheometer according to Standard DIN 53529.

The results obtained are shown in Table XV.

TABLE XV

| Compositions | Control 4 | Comp. 3 | Comp. 4 |
|---|---|---|---|
| Tm (dN · m) | 7.5 | 6.6 | 7.9 |
| TM (dN · m) | 77.9 | 68.1 | 70.4 |
| Ts2 (min) | 2.3 | 2.3 | 2.3 |
| T90 (min) | 18.0 | 17.8 | 19.2 |
| Rcross_max (dN · m/min) | 7.5 | 6.7 | 6.2 |

It is found that the compositions comprising a silica according to the invention exhibit a satisfactory combination of rheometric properties, the latter being similar to, indeed even better than, those of the control composition, with the same amount of silica involved or with the same hardness.

Mechanical Properties of the Vulcanisates

The measurements are carried out on optimally vulcanized compositions (t98) for a temperature of 160° C.

The uniaxial tensile tests are carried out in accordance with the instructions of Standard NF T 46002 with test specimens of H2 type at a rate of 500 mm/min on an Instron 5564 device.

The measurement of Shore A hardness of the vulcanisates is carried out according to the instructions of Standard ASTM D2240.

The properties measured are collated in Table XVI.

TABLE XVI

| Compositions | Control 4 | Comp. 3 | Comp. 4 |
|---|---|---|---|
| 100% Modulus (MPa) | 2.08 | 1.82 | 2.23 |
| 300% Modulus (MPa) | 7.1 | 6.3 | 7.8 |
| 300% Modulus/100% Modulus | 3.4 | 3.5 | 3.5 |
| Tensile strength (MPa) | 14.0 | 13.5 | 16.0 |
| Elongation at break (%) | 459.6 | 485.2 | 489.7 |
| Shore A hardness - 15 s (pts) | 60 | 57 | 60 |

It is found that the silica according to the invention exhibits a satisfactory reinforcing nature and confers, on the elastomeric compositions, a mechanical behaviour comparable (composition 3), indeed even superior (composition 4), to that conferred by the control silica.

It is found that an increase in the degree of charging of the silica according to the present invention (composition 4) makes it possible to achieve an identical hardness to that of the control composition while improving its reinforcing behaviour in comparison with the latter.

Dynamic Properties of the Vulcanisates

The dynamic properties are measured as above using a viscosity analyser (Metravib VA3000) according to Standard ASTM D5992 in compression mode.

The results, presented in Table XVII, are the compressive complex modulus (E*, 60° C., 10 Hz) and the loss factor (tan δ, 60° C., 10 Hz).

TABLE XVII

| Compositions | Control 4 | Comp. 3 | Comp. 4 |
|---|---|---|---|
| E*, 60° C., 10 Hz | 8.7 | 7.0 | 8.3 |
| Tan δ, 60° C., 10 Hz | 0.089 | 0.085 | 0.094 |

The dynamic properties in shear mode are then measured as above using a viscosity analyser (Metravib VA3000) according to Standard ASTM D5992 and the results are shown in Table XVIII.

TABLE XVIII

| Compositions | Control 4 | Comp. 3 | Comp. 4 |
|---|---|---|---|
| Tan δ max return, 40° C., 10 Hz | 0.171 | 0.146 | 0.164 |
| ΔG', 40° C., 10 Hz | 2.38 | 1.45 | 2.14 |

Compositions 3 and 4, which comprise the silica according to the invention, exhibit good dynamic properties, which also proves to be particularly advantageous for the properties of the finished articles based on these compositions.

It is found that, at 40° C. and 60° C., the value of the loss factor or tangent δ obtained for the compositions comprising the silica according to the present invention is, with the same amount of silica involved (composition 3), improved in comparison with that which is obtained for the control composition, independently of the mode of dynamic stresses, and is, with the same hardness (composition 4), comparable, indeed even improved, in comparison with that which is obtained for the control composition.

A reduction in the nonlinearity at 40° C., associated with the Payne effect (ΔG'), is also observed with the silica according to the invention.

Thus, the silica according to the present invention makes it possible to obtain a highly satisfactory compromise in rheological, mechanical and dynamic properties, in particular hysteresis properties, in particular a highly satisfactory hysteresis/reinforcing compromise, especially in comparison with the control silica.

The invention claimed is:

1. A precipitated silica, comprising aggregates of precipitated silica primary particles (A) at the surface of which are grafted silica primary particles (B), wherein the silica primary particles (B) have a size smaller than that of the primary particles (A), and having:
   a CTAB specific surface ($S_{CTAB}$) ranging from 60 to 400 m$^2$/g;
   a d50 median size of aggregates, measured by XDC particle sizing after ultrasonic deagglomeration, such that the value of d50 expressed in nanometers is greater than $$\left(6214 \, \frac{nm}{m^2/g} \bigg/ S_{CTAB}\right) + 23 \text{ nm};$$

a pore volume distribution such that the ratio V(d5-d50)/V(d5-d100) is greater than $$0.906 - \left(0.0013 \, \frac{1}{m^2/g} \times S_{CTAB}\right);$$

and
   a pore size distribution such that the value of the Mode expressed in nanometers is greater than $$\left(4166 \, \frac{nm}{m^2/g} \bigg/ S_{CTAB}\right) - 9.2 \text{ nm};$$

wherein $S_{CTAB}$ is the value of the CTAB specific surface expressed in m$^2$/g.

2. The precipitated silica as defined by claim 1, comprising aggregates of large silica primary particles, at the surface of which are small silica primary particles, the number median diameter of the large primary particles being at least 12 nm and the number median diameter of the small primary particles ranging from 2 to 8 nm.

3. The precipitated silica as defined by claim 1, having a pore volume distribution such that $V_{(d5-d50)}/V_{(d5-d100)} > 0.71$.

4. The precipitated silica as defined by claim 1, having a CTAB specific surface ($S_{CTAB}$) ranging from 80 to 300 m$^2$/g.

5. The precipitated silica as defined by claim 1, having a BET specific surface ($S_{BET}$) ranging from 60 to 500 m$^2$/g.

6. The precipitated silica as defined by claim 1, having a CTAB specific surface ($S_{CTAB}$) and a BET specific surface ($S_{BET}$) such that the $S_{BET}/S_{CTAB}$ ratio ranges from 1.0 to 1.5.

7. The precipitated silica as defined by claim 1, having a median diameter ($D_{5M}$), after ultrasonic deagglomeration, of less than 6.0 μm.

8. The precipitated silica as defined by claim 1, in the form of substantially spherical beads, optionally having a mean size of at least 80 μm.

9. The precipitated silica as defined by claim 1, in the form of a powder, optionally having a mean size of at least 3 μm.

10. The precipitated silica as defined by claim 1, in the form of granules, optionally having a size of at least 1 mm.

11. The precipitated silica as defined by claim 1, wherein the proportion of isolated small primary particles (B), aggregated or not aggregated together, is less than 10% by number.

12. The precipitated silica as defined by claim 1, having a parameter C, measured by small angle X-ray scattering (SAXS), such that $C/S_{CTAB}$ is greater than 0.001 g/m², wherein $S_{CTAB}$ is the value of the CTAB specific surface expressed in m²/g.

\* \* \* \* \*